United States Patent [19]

Ogata et al.

[11] Patent Number: 5,358,260
[45] Date of Patent: Oct. 25, 1994

[54] DISPLAYING AND CONVEYING APPARATUS AND GAME MACHINE USING THE SAME

[75] Inventors: Mitsuru Ogata, Kawasaki; Hiroyuki Kobayashi, Tokyo; Toshitake Inagaki, Sagamihara; Takashi Masuko, Kawaguchi; Hiroshi Takeuchi, Tokyo, all of Japan

[73] Assignee: Namco Ltd., Tokyo, Japan

[21] Appl. No.: 45,889

[22] Filed: Apr. 14, 1993

[30] Foreign Application Priority Data

Apr. 16, 1992 [JP] Japan .................. 4-124345

[51] Int. Cl.⁵ .................. A63F 9/00; B65G 15/12; B65G 15/28
[52] U.S. Cl. .................. 273/454; 198/626.1; 198/815; 198/836.1; 198/839
[58] Field of Search .................. 273/454, 440, 445–448; 198/580, 839, 815.814, 836.1, 836.2, 626.1, 606, 626.2; 40/524, 525

[56] References Cited

U.S. PATENT DOCUMENTS

| | | | |
|---|---|---|---|
| 756,551 | 4/1904 | Abraham | 198/580 X |
| 983,669 | 2/1911 | Beier | 198/580 X |
| 1,499,319 | 6/1924 | Reid, Jr. | 198/815 X |
| 1,972,753 | 9/1934 | Bausman | 198/815 |
| 2,128,594 | 8/1938 | Rasmussen | 198/839 X |
| 2,128,595 | 8/1938 | Rasmussen | 198/839 X |
| 2,326,098 | 8/1943 | Kimmich | 198/815 |
| 3,666,082 | 5/1972 | Riggs | 198/836.1 X |
| 3,777,877 | 12/1973 | Piper | 198/836.1 X |
| 3,805,743 | 4/1974 | Crowder | 198/836.1 X |

FOREIGN PATENT DOCUMENTS

| | | | |
|---|---|---|---|
| 2908 | 1/1989 | Japan | 198/839 |
| 3-88608 | 4/1991 | Japan | 198/839 |
| 1666405 | 7/1991 | U.S.S.R. | 198/815 |
| 613794 | 12/1948 | United Kingdom | 198/815 |
| 1284745 | 8/1972 | United Kingdom | 198/839 |

Primary Examiner—Paul E. Shapiro
Attorney, Agent, or Firm—Oliff & Berridge

[57] ABSTRACT

A main conveyor belt endlessly conveys articles to be displayed. A side conveyor belt guides said articles in the direction of conveyance. Said main conveyor belt is disposed along an endless conveyance path having a plurality of corners, and said side conveyor belt is disposed along the outer periphery of said main conveyor means and in a direction in which the plane of conveyance of said side conveyor belt intersects the plane of conveyance in said main conveyor belt.

35 Claims, 23 Drawing Sheets

DISPLAYING AND CONVEYING APPARATUS AND GAME MACHINE USING THE SAME

BACKGROUND OF THE INVENTION

1. Field of the Invention:

The present invention relates to a displaying and conveying apparatus for endlessly conveying articles to be displayed to a display location and a game machine using such a displaying and conveying apparatus.

2. Description of the Prior Art:

There is known a game machine comprising a rotary display platform for moving articles along a conveyance path and means for picking up and taking out the articles. One of such game machines is described in Japanese Utility-Model Laid-Open No. Sho 62-157593.

Such game machines are usually in the form of a crane type game machine which comprises a rotary display platform located in and covered with a transparent plastic cover and rotatably driven while carrying many articles, a crane having a shovel for picking up one of the articles from the rotary display platform, and an articles gaining port for taking out the picked article. When a player depresses a start button or the like, the crane can be actuated to move to a position directly above an article to be picked out. The shovel mounted on the crane at its lower end can be then manipulated by the player to pick up the article and to take it out through the article gaining port when the article is picked out by the shovel.

Such a game machine has the following disadvantages since it utilizes the rotary disc-like table as conveying means:

(1) The space in which the articles are displayed is limited by the configuration of the rotary table which is used as conveying means. Thus, the housings of many game machines are frequently limited to be of a circular or square cross-section. Particularly, the prior art cannot provide a display space having its transversely spread configuration.

(2) When the rotary table is used as conveying means, the articles will endlessly be conveyed while being maintained at their invariable positions on the rotary table. The articles will not be agitated on the rotary table. Even if the player effortfully manipulates the crane to pick up an article covered by the other articles, he can hardly take it. This will spoil the pleasure of the crane game.

(3) In the prior art game machine using the rotary table, articles on the rotary table adjacent to the outer periphery thereof, such as stuffed dolls, may be gradually damaged by contacting the transparent plastic cover of the game machine when the table is being rotated. Since the articles are frequently moved along the endless path for a long time in such a game machine, it was desired to avoid the damage of the articles due to continuous rotation of the table.

SUMMARY OF THE INVENTION

It is therefore an object of the present invention to provide a displaying and conveying apparatus having a display space which can be formed into any desired configuration and in which articles to be displayed are placed and endlessly moved while being effectively agitated with less damage.

Another object of the present invention is to provide a game machine utilizing such a displaying and conveying apparatus.

To this end, the present invention provides a displaying and conveying apparatus for conveying articles to be displayed along an endless conveyance path including a plurality of corners, said displaying and conveying apparatus comprising main conveyor means including a main conveyor belt for endlessly conveying said articles to be displayed, and side conveyor means including a side conveyor belt for guiding said articles in the direction of conveyance, said main conveyor belt being disposed along an endless conveyance path having a plurality of corners, said side conveyor belt being disposed along the outer periphery of said main conveyor means and in a direction in which the conveyance plane of said side conveyor belt intersects the plane of conveyance in said main conveyor belt.

The main conveyor means preferably comprises a main belt tensioning portion which is provided between adjacent corners to turn said main conveyor belt to be tensioned and a main belt turning portion at each of said corners about which said main conveyor belt is turned, said main belt tensioning portion including main belt tensioning guide means disposed to form a gap for drawing in said main conveyor belt and main belt tensioning and turning means about which said main conveyor belt is turned to be tensioned after said main conveyor belt has been drawn in through said gap in said main belt tensioning guide means, and said main belt turning portion including main belt guide means disposed at each of said corners to form a gap for drawing in said main conveyor belt and main belt guiding and turning means about which said main conveyor belt is turned after it has been drawn in through said gap in said main belt guide means.

The side conveyor means preferably comprises a side belt turning portion at each of said corners and a side belt tensioning portion which is disposed between adjacent corners to turn said side conveyor belt to be tensioned, said side belt turning portion including side belt guide means disposed to form a gap for drawing in said side conveyor belt at each corner and side belt guiding and turning means about which said side conveyor belt is turned after it has been drawn in through said gap in said side belt guide means, and said side belt tensioning portion including side belt tensioning guide means disposed to form a gap for drawing in said side conveyor belt and side belt tensioning and turning means about which said side conveyor belt is turned to be tensioned after said side conveyor belt bas been drawn in through said gap ill said side belt tensioning guide means.

In such all arrangement, a conveyance path of any desired configuration having a plurality of corners can be defined by the main and side conveyor belts. It is thus possible to provide a display space of any desired configuration and particularly of a transversely spread configuration.

The main conveyor belt may be a single endless one while the side conveyor belt may also be a single endless one. The use or a conveyance path defined by such main and side conveyor belts can simplify the entire structure with highly reduction of the manufacturing cost. Particularly, if the conveyance path is divided into a plurality of sections, it is required to provide an independent belt drive source for each section. However, the number of drive sources may be reduced by using only one main conveyor belt and one side conveyor belt to define the entire conveyance path. This also results in great reduction of the manufacturing cost.

According to the present invention, the articles can be endlessly conveyed while the main and side conveyor belts co-operate with each other to efficiently agitate the articles at the corners of the endless conveyance path. Thus, the articles will be endlessly conveyed while being always placed on the turntable at the different position. This is very preferable as for the crane type game machines.

Particularly, when the side conveyor belt is disposed tilted outwardly relative to the main conveyor belt, the articles conveyed by the main conveyor belt are conveyed and agitated to move over the corresponding side conveyor belt at each corner. Thus, the articles can more effectively be agitated at the corners.

Particularly, when the side conveyor belt is tilted outwardly relative to the surface of conveyance in the main conveyor belt and even if box-like articles engage with each other at a corner, the article in front move over the side conveyor belt to attenuate the impact between the conveyed articles, resulting in large reduction of damage against the articles at the corners.

According to the present invention, further, the side conveyor belt is disposed along the outer margin of the main conveyor belt. This further reduces the damage of the endlessly conveyed articles from contact with the side walls in the conveyance path.

When the lower side edge of the side conveyor belt is located below the conveyance plane of the main conveyor belt, plate-like articles such as slab chocolates may reliably be conveyed by the side conveyor belt without damage.

The present invention also provides a game machine comprising a displaying and conveying apparatus for conveying game articles to be displayed along an endless conveyance path including a plurality of corners, and article taking-out means responsive to the instruction of a player for taking out the game articles, said displaying and conveying apparatus comprising main conveyor means including a main conveyor belt for endlessly conveying said game articles and side conveyor means including a side conveyor belt for guiding the game articles in the direction of conveyance, said displaying and conveying apparatus being disposed on a display platform, and said side conveyor belt having a plane of conveyance extending along the outer periphery of said main conveyor means and positioned relative to the conveyance plane of said main conveyor belt so that said side conveyor belt intersects said main conveyor belt.

The article taking-out means preferably includes an article picking-up portion responsive to the instruction of the player to pick up and fall an article at a predetermined position.

It is also preferred that the article taking-out means comprises an article feeding-out portion for sequentially receiving and feeding articles fallen down from said article picking-up portion to an article taking-out port, said article feeding-out portion including an article pressing-out portion, a fixed plate having one end directed to said article taking-out port, and a slide plate disposed on said fixed plate to sequentially receive the game articles fallen down from said article picking-up portion, said slide plate being reciprocatable between a position in which the forward end of said slide plate is in front of said article taking-out port and another position in which the rearward end of said slide plate is moved below said article pressing-out portion by a given distance, whereby the game articles moved onto said slide plate can sequentially be pressed toward the forward end of said slide plate by said article pressing-out portion and fallen onto said fixed plate, the game articles fallen onto said fixed plate being sequentially pressed out by the forward end of said slide plate toward said article taking-out port through the forward movement of the slide plate.

In such an arrangement, the game articles can be conveyed while being agitated. As a result, the player can more pleasantly play the game for gaining desired articles.

DETAILED DESCRIPTION OF THE PREFERRED EMBODIMENTS

Figure 1:
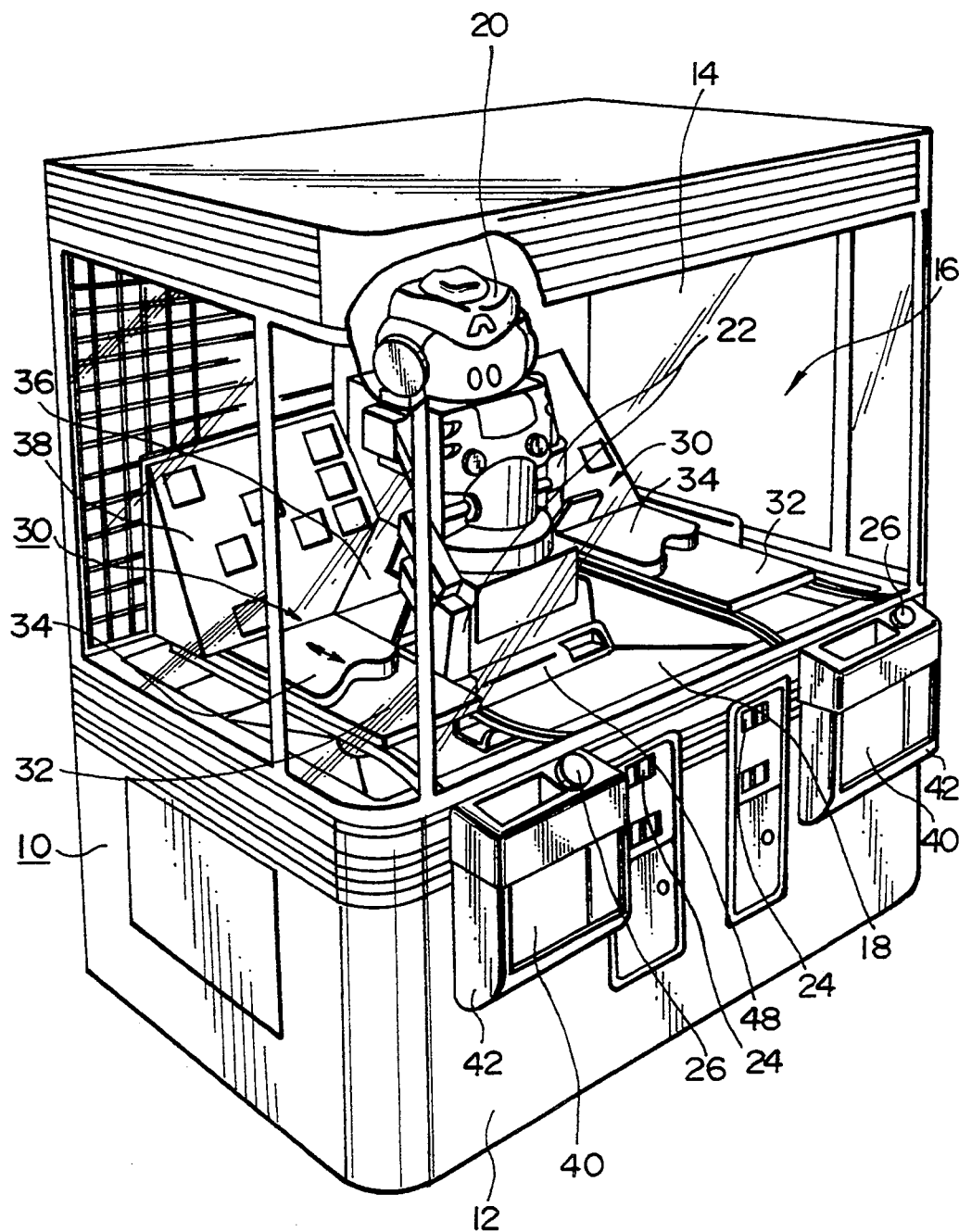
FIG. 1 is a schematic and perspective view of the entire arrangement of a game machine to which the present invention is applied.

Referring to FIG. 1, there is shown a shovel type game machine to which the present invention is applied. The game machine comprises a transversely extending housing 10, the lower half of which defines an opaque housing body 12. The top of the housing body 12 supports transparent front and side windows 14 which form a display space 16.

A transversely extending partition platform 48 is centrally located on the top of the housing body 12 within the display space 16. The partition platform 48 supports a shovel robot 20 which races the front of the housing body 12.

The partition platform 48 is surrounded by a substantially rectangular conveyance platform 18 extending in the transverse direction. The conveyance platform 18 is used to convey various articles such as stuffed dolls, chocolates and so on, in the endless manner. A player can observe the conveyance of the articles through the transparent windows 14.

The shovel robot 20 includes a pair of shovel arms 22 mounted thereon at the opposite sides. Each of the shovel arms 22 is used to pick up the articles which are being conveyed on the conveyance platform 18.

An articles taking-out mechanism 30 is located within the display space 16 at an outward position adjacent to each of the shovel arms 22. Each of the articles taking-out mechanisms 30 is adapted to move an article picked up by the shovel arm 22 to a taking-out port 40 formed on the side of the housing body 12 on a given condition.

Each of the taking-out mechanisms 30 includes a fixed table 32, a slide table 34 and a sloping plate 36. The fixed table 32 is disposed to extend toward the taking-out port 40 while the slide table 34 is reciprocated on the fixed table 32 away from and toward the taking-out port 40 within a given extent. If the article falls down from the shovel arm 22, it is conducted onto the slide table 34 through the sloping plate 36. The article will be reciprocated by the movement of the slide table 34.

A back wall 38 is located backwardly of the taking-out mechanism 30 and functions to urge the article forwardly. When the slide table 34 moves toward the back wall 38, the slide table 34 will not be resisted, but the article on the slide table 34 is prevented from further moving by the back wall 38. As a result, the article will be moved to the forward end of the slide table 34 by the back wall 38. Such a function is repeated as the articles are successively conveyed onto the slide table 34 by the shovel arms 22. Thus, the first article on the slide table 34 is gradually urged forwardly and finally falls from the slide table 34 onto the fixed table 32. The article fallen the fixed table 32 is then fallen from the forward end of the fixed table 32 into the taking-out port 40 through the forward movement of the slide table 34.

Figure 3:
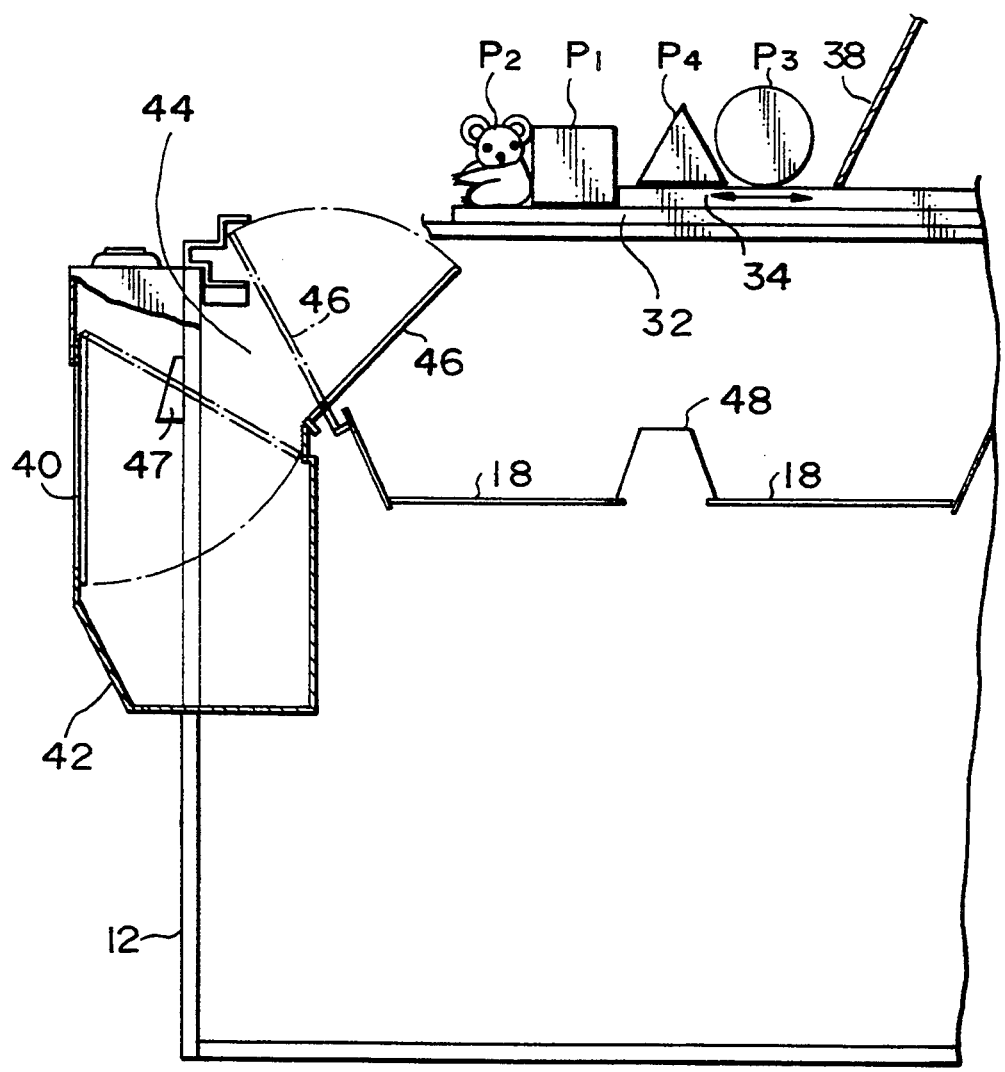
FIG. 3 is a schematic and cross-sectional view of the articles taking-out mechanism and articles taking-out housing portion in the game machine of FIG. 1.

FIG. 3 is a schematic cross-section of that portion of the game machine which is located between the article taking-out mechanism 30 and the article taking-out port 40. The taking-out port 40 is formed in the front side or an article taking-out housing 42 which is provided in the front side of the housing body 12. The article taking-out port 40 communicates with an article gaining port 44 which is formed in the housing body 12 above the taking-out housing 40 and directed to the fixed table 32. The article gaining port 44 is normally closed by a lid plate 46 which prevents articles P from falling from the fixed table 32 into the taking-out housing 42.

The lid plate 46 is pivotally connected to the housing body 12 adjacent to the lower end or the lid plate 46. More particularly, the lid plate 46 is pivotable between a close position in which the article gaining pert 44 is closed by the lid plate 46 as shown by alternate long and short dash line in FIG. 3 and an open position in which the lid plate 46 is opened to serve as an article guide leading to the fixed table 32 as shown by solid line in FIG. 3.

When the game is initiated by a player, the lid plate 46 is pivoted from its close position to its open position by a drive (not shown). In the open position, the lid plate 46 functions as a guide plate for conducting the articles P fallen from the forward end of the fixed table 32 into the taking-out housing 42. If the player intentionally oscillates the housing 10 to fall the articles P from the fixed table 32 into the taking-out housing 42, it is sensed by an oscillation sensor 47 which is located within the taking-out housing 42. The oscillation sensor 47 then generates a signal that is used to forcedly move the lid plate 46 from its open position to its close position. As a result, the article gaining port 44 will be closed to prevent the unfair practice.

At the end of the game, the lid plate 46 is similarly pivoted from its open position to its close position to close the article gaining port 44.

When a coin is thrown into a coin slot 24, the game is initiated and the lid plate 46 is pivoted from its close to its open position. The player can manipulate the button 26 while viewing the articles that are being conveyed on the conveyance platform 18. Thus, a shovel arm 22 is actuated to pick up the articles. If an article is successfully picked up by the shovel arm 22, that article is then fallen onto the sloping plate 36 and moves onto the slide table 34 through the sloping plate 36. As described, the article is urged forwardly by the taking-out mechanism 30 and then fallen into the taking-out housing 42 through the slide table 34, fixed table 32 and lid plate 46. In such a manner, the player may take out the articles conveyed on the conveyance platform 18.

The conveyance platform 18 located within the display space 16 on the housing body 12 will now be described in detail.

Figure 4:
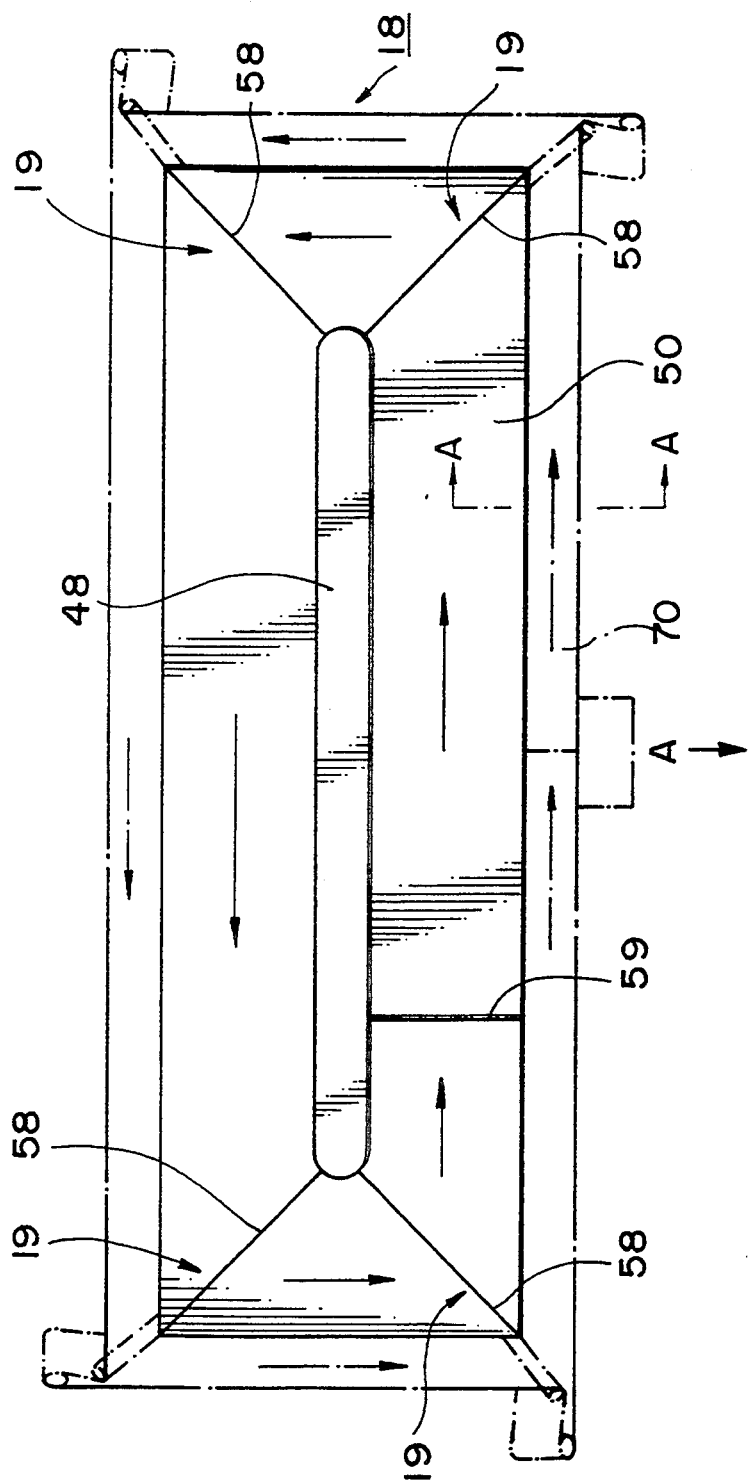
FIG. 4 is a plan view of a main conveyor belt usable in one embodiment of a game machine constructed in accordance with the present invention.
Figure 5:
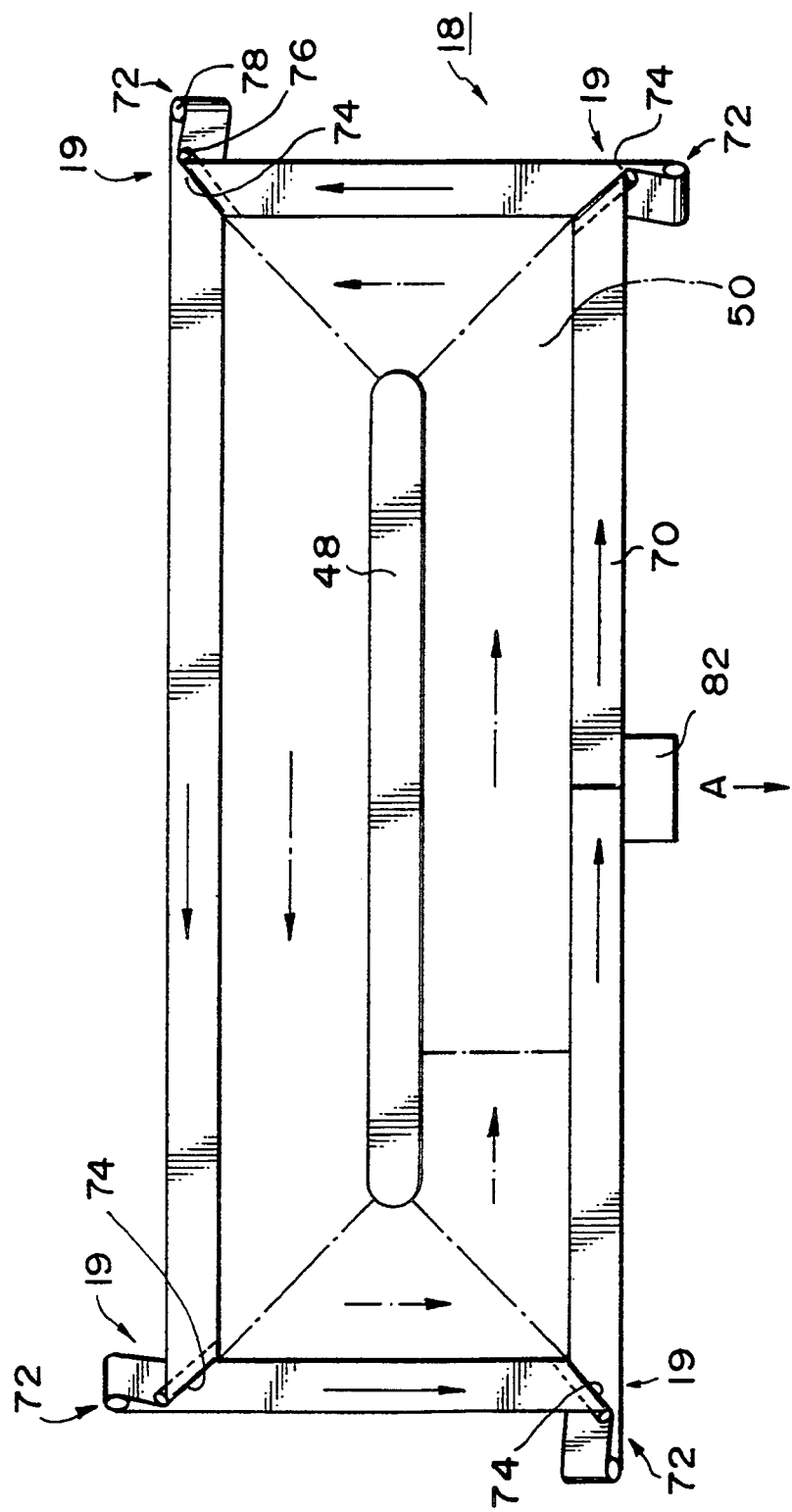
FIG. 5 is a plan view of a side conveyor belt usable in one embodiment of a game machine constructed in accordance with the present invention.

FIGS. 4 and 5 schematically show the construction of the conveyance platform 18. In these figures, arrow A represents the front side of the game machine.

As soon from FIG. 4, the conveyance platform 18 comprises a main conveyor belt 50 which is arranged to extend in the transverse direction and to surround the partition platform 48. The main conveyor belt 50 is moved around the partition platform 48 in a direction shown by an arrow in FIG. 4 such that various articles such as stuffed dolls, chocolates and the like will be endlessly conveyed.

As soon from FIG. 5, a side conveyor belt 70 is also arranged around the outer periphery of the main conveyor belt 50. The side conveyor belt 70 has its conveyance plane that is positioned in a direction intersecting the conveyance plane of the main conveyor belt 50. The articles conveyed by the main conveyor belt 50 are guided by the side conveyor belt 70 in the direction of conveyance.

Such a combination of the main conveyor belt 50 with the side conveyor belt 70 can reduce the damage or the articles conveyed by the main conveyor belt 50 at the outer periphery thereof.

In the illustrated embodiment, the speed of movement of the main conveyor belt 50 is set to be substantially the same as that of the side conveyor belt 70. Thus, articles P placed on the main conveyor belt 50 at the outer periphery thereof can be guided by the side conveyor belt 70 at the same speed, resulting in more reduction of the damage in the articles.

Figure 6:
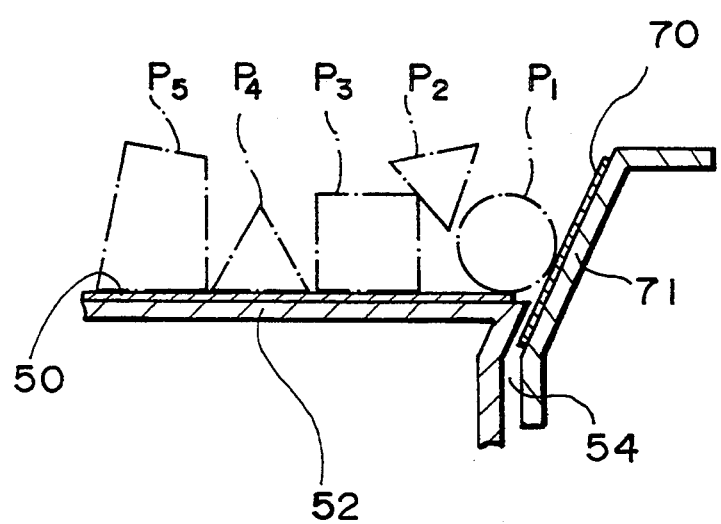
FIG. 6 is a cross-sectional view of the conveyance path, taken along a linen A—A in FIG. 4.

FIG. 6 is a cross-sectional view of the conveyance platform 18 shown in FIG. 4, taken along a line A—A in the same figure.

The main conveyor belt slidably moved on a main conveyance frame 52 of metal which is arranged along the conveyance path.

The side conveyor belt 70 is also slidably moved on a side conveyance frame 71 of metal which is arranged along the conveyance path.

The side conveyor belt 70 has its conveyance plane that is tilted outwardly relative to a plane perpendicular to the conveyance plane of the main conveyor belt 50. In the illustrated embodiment, the conveyance plane of the side conveyor belt 70 is tilted outwardly by $\theta=25$ degrees relative to the plane perpendicular to the conveyance plane of the main conveyor belt 50. The lower side edge or the side conveyor belt 70 is positioned below the side edge of the main conveyor belt 50 so that thin plate-shaped article such as slab chocolates can reliably be conveyed by the main and side conveyor belts 50, 70.

This ensures that the urging force can be dispersed even if the articles P placed on the main conveyor belt 50 at the outer periphery thereof are urged against the outwardly tilted side conveyor belt 70. Thus, the damage of the articles can be further reduced.

A gap 54 for removing dirt is formed between the main and side conveyance frames 52, 71 entirely or partly over the circumference of the main conveyance frame 52. Dirt such as dust from stuffed dalls is removed through this gap 54.

When the conveyance system is defined by the main and side conveyor belts 50, 70 as in the conveyance platform 18 of the illustrated embodiment, the articles can effectively be agitated by co-operation of both the conveyor belts 50, 70 in the conveyance path at each corner 19.

In the illustrated embodiment, particularly, the internal angle at each corner is equal to 90 degrees. If many articles are being conveyed under such a condition as they are placed one above another, the articles can be agitated by the changing of the direction in which both the main and side conveyor belts 50, 70 move. Since the articles are agitated by simultaneous interaction between the main and side conveyor belts 50, 70, the articles can effectively be agitated in both the vertical and horizontal directions.

Such a situation is shown in FIGS. 7A-7D.

Figure 7A:
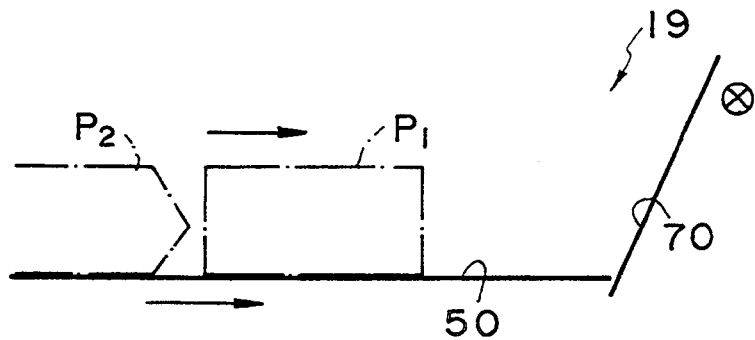
FIGS. 7A–7D, illustrate a series of conveying operations in the conveyance path of the game machine at a corner.
Figure 7B:
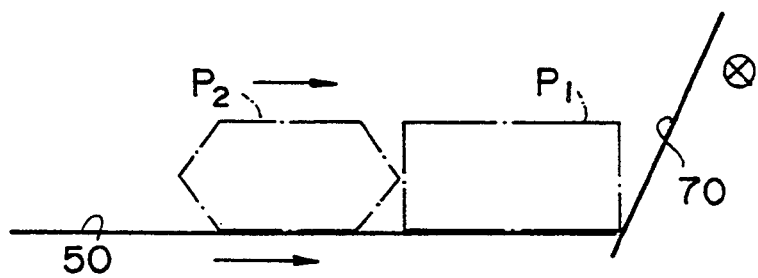
Figure 7C:
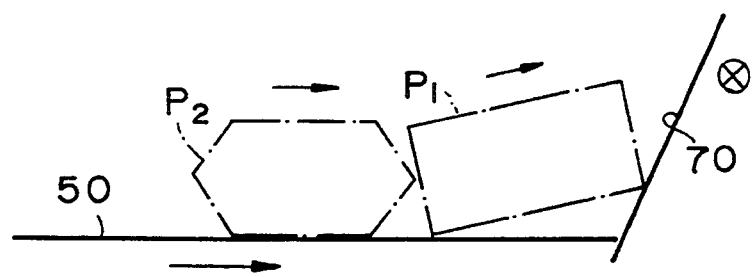
Figure 7D:
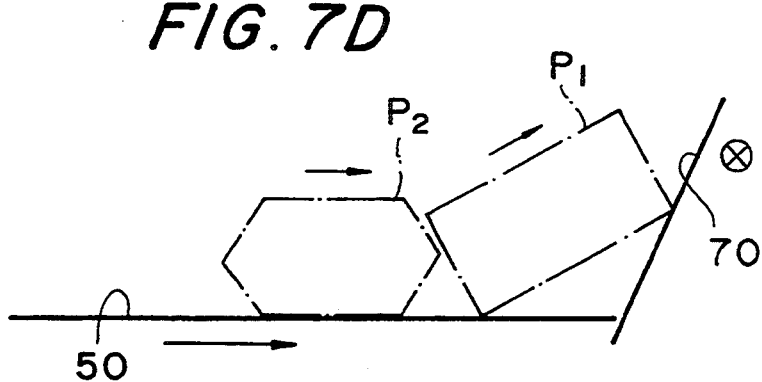

Referring first to FIG. 7A, it is now assumed that the main conveyor belt 50 successively conveys a first box-like article P1 and a second article P2 having sharpened points. As soon from FIG. 7B, the first article P1 is first prevented from further moving at a corner 19 and then impacted by the second article P2. As shown in FIGS. 7C and 7D), however, the first article P1 moves over the side conveyor belt 70 to attenuate the impact and is turned to a different direction since the side conveyor belt 70 is arranged to be tilted outwardly. Thus, the articles P can be protected from being damaged at each corner 19. Particularly, it can effectively be prevented that the first box-like article is deformed and damaged between the second article and the side conveyor belt 70.

In the illustrated conveyance platform 18, the articles P can continue to be conveyed in the endless manner for a long time while preventing them from being damaged as much as possible. At each corner 19 in the conveyance path, the articles P being conveyed are effectively agitated. Each of the articles P is differently directed at the passage of each corner 19. Therefore, the player can depress the button 26 and use the shovel arm 22 to pick up a desired article while viewing the articles agitated and differently directed for every round. This highly improves the amusingness in the crane type game machine.

The reduction of damage in the articles P conveyed on the conveyance platform 18 can provide the articles P of improved quality to the player.

The arrangement of the main and side conveyor belts 50, 70 will be described in more detail.

Figure 8:
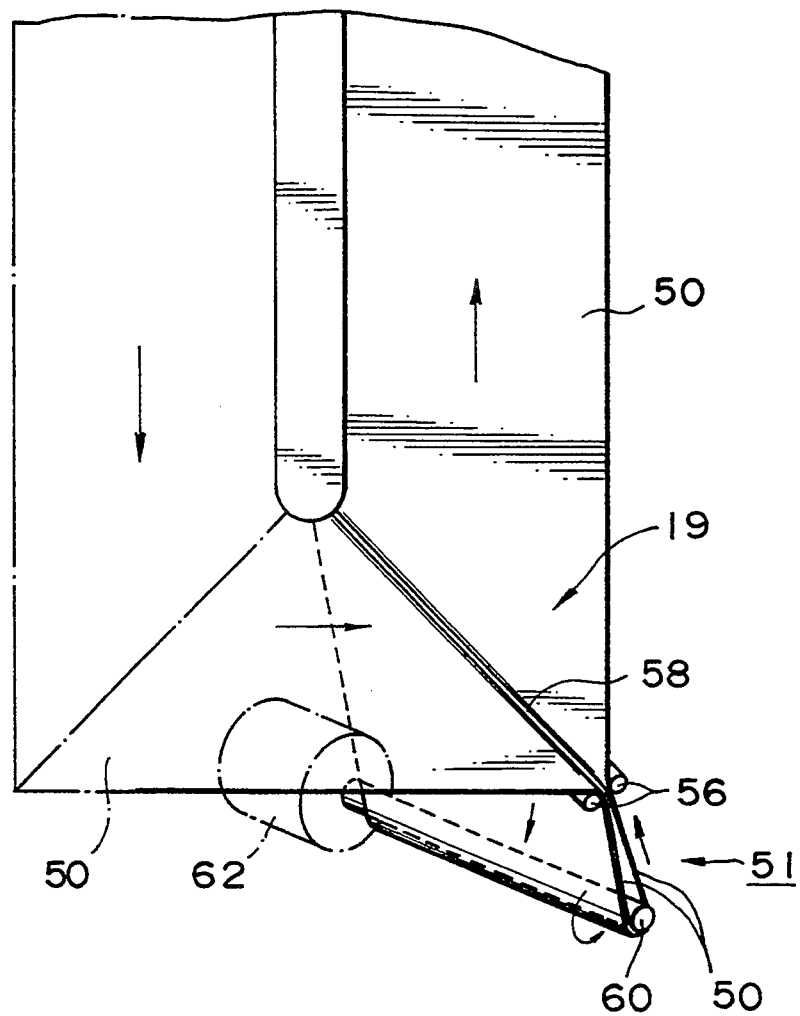
FIG. 8 a schematic view of the main belt turning mechanism in the main conveyor belt of FIG. 4 at a corner.
Figure 9:
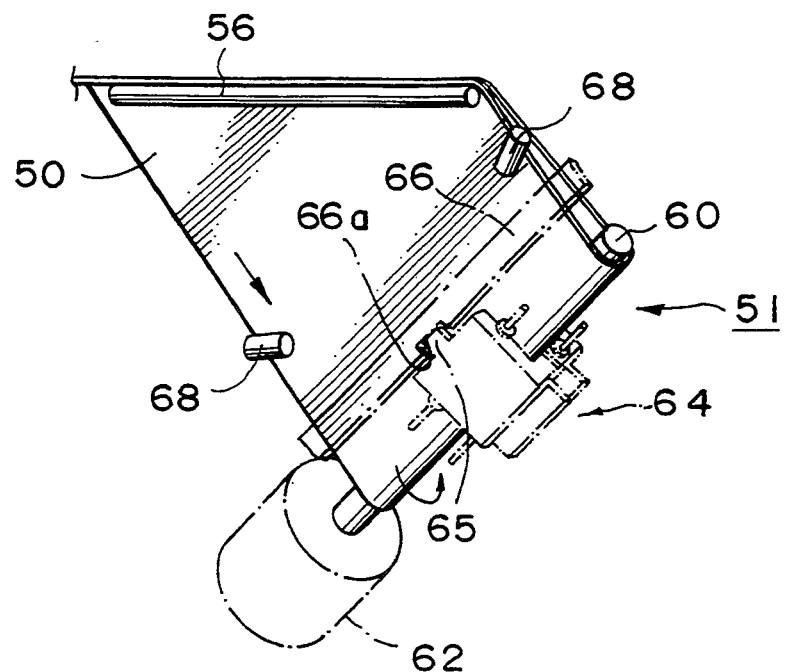
FIG. 9 is a schematic side view or the main belt turning mechanism shown in FIG. 8.

The main conveyor belt 50 is a single endless conveyor belt and is turned about a main conveyor belt turning portion 51 shown in FIGS. 8 and 9 at each corner shown in FIG. 4. The main conveyor belt 50 is turned about at least one belt tensioning and turning portion 58 which is disposed in a straight run of the conveyance path shown in FIG. 11.

FIGS. 8 and 9 show one main conveyor belt turning portion 51 at each corner 19. The components other than the main conveyor belt 50 and turning portion 51 are omitted for simplification. In order that such an arrangement can visually be understood, FIG. 8 shows a roller 60 and others which are shifted transversely rather than directly below a minute gap 58.

The main conveyor belt turning portion 51 comprises main conveyor belt drawing-in guides 56 that are arranged opposed to each other to term the gap 58 For drawing in the belt at each corner 19 (which gap intersects the direction or conveyance with an angle of 45 degrees), and a main conveyor belt turning roller 60 located below the guides 56 to absorb any slack in the main conveyor belt 50. Such main conveyor belt turning portions 51 are provided at four corners 19 shown in FIG. 4. In such a manner, the main conveyor belt 50 is arranged to form a rectangular layout or conveyance plane.

One or the main conveyor belt turning portions 51 at the respective corners 19 includes its main conveyor belt turning roller 60 that is operatively connected to a drive motor 62 as shown by alternate long and short dash line in FIG. 8. When the drive motor 62 is energized, the main conveyor belt 50 is driven in a direction of arrow.

If the frictional resistance between the roller 60 connected directly to the drive motor 62 and the main conveyor belt 50 is too small, the driven roller 60 is driven in the lost motion and the main conveyor belt 50 cannot effectively be driven. For such a reason, a clip 64 is used in the illustrated embodiment, as shown in FIG. 9. The clip 64 is detachably mounted on the driven roller 60 to hold and press the main conveyor belt 50 against the driven roller 60.

Figure 10:
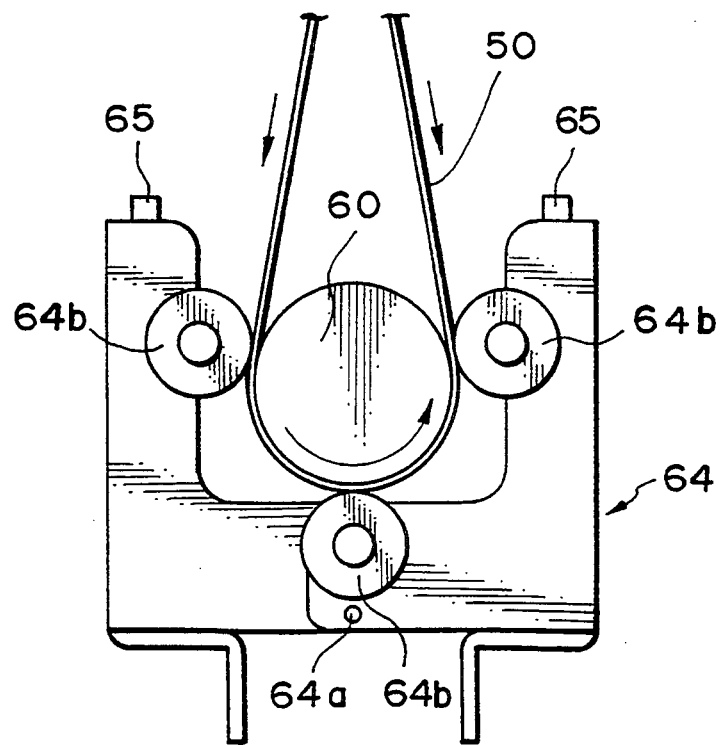
FIG. 10 is a cross-sectional view of the main belt turning mechanism shown in FIG. 9, with a clip being mounted on the drive roller.

FIG. 10 shows the cross-section of the clip 64 mounted on the driven roller 60. The clip 64 is elasticized about a shaft 64a to hold the roller 60 under pressure. The clip 64 has three spaced rollers 64b that urge the main conveyor belt 50 against the driven roller 60 under pressure. Thus, the rotation of the motor 62 can positively be transmitted to the main conveyor belt 50 through the roller 60 so that the main conveyor belt 50 can efficiently be driven ill the direction of arrow.

The clip 64 is preferably positioned to hold the roller 60 substantially at the longitudinal center axis of the main conveyor belt 50. To this end, the forward ends of the clip 64 have positioning projections 65. These projections 65 engage in recesses 66a of a positioning frame 66 which is formed below the conveyance platform 18 (see FIG. 9).

As seen from FIG. 9, each of the main conveyor belt turning portions 51 includes positioning idlers 68 for preventing the main conveyor belt 50 from undesirably shifted. These idlers 68 function to tension and return the main conveyor belt 50 to its original position.

Figure 11:
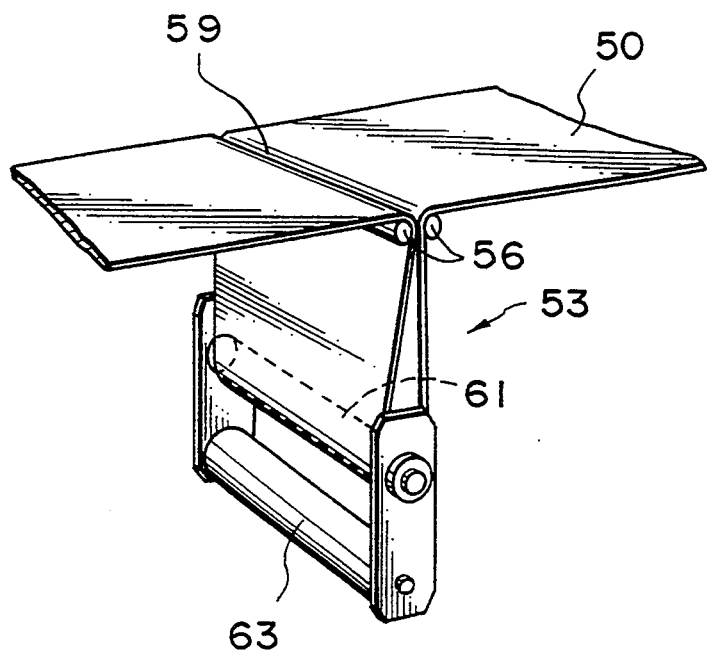
FIG. 11 is a schematic and perspective view of the tension roller turning mechanism used in the main conveyor belt.

FIG. 11 shows one of the belt tensioning and turning portion 53 that is located below a minute gap 59 shown in FIG. 4. The belt tensioning and turning portion 53 comprises main conveyor belt drawing-in guides 56 that are disposed opposed to each other to form the gap 59 for drawing in the belt from the conveyance path (which gap extends to intersect the direction of conveyance with an angle of 90 degrees), and a tensioning roller 61 located below the guides 56 and disposed to absorb any slack in the main conveyor belt 50. The ends of the tensioning roller 61 are fixedly connected to a weight 63 which applies an appropriate tension to the main conveyor belt 50 under gravity. In such a manner, the slack can be absorbed at any place in the conveyance path when the main conveyor belt 50 is being moved in the direction of arrow.

In the embodiment shown by FIGS. 8, 9 and 11, the belt drawing-in guides 56 may be replaced by the outwardly turned ends of the main conveyance frame 52 shown in FIG. 6.

The side conveyor belt 70 will now be described in detail.

The side conveyor belt 70 is a single endless conveyor belt. As shown in FIG. 5, the side conveyor belt 70 is turned about a side conveyor belt turning portion 72 at each corner 19 and further turned about a side conveyor belt drive 82 in the course of the conveyance path. The side conveyor belt 70 is driven in the direction of arrow.

Figure 12:
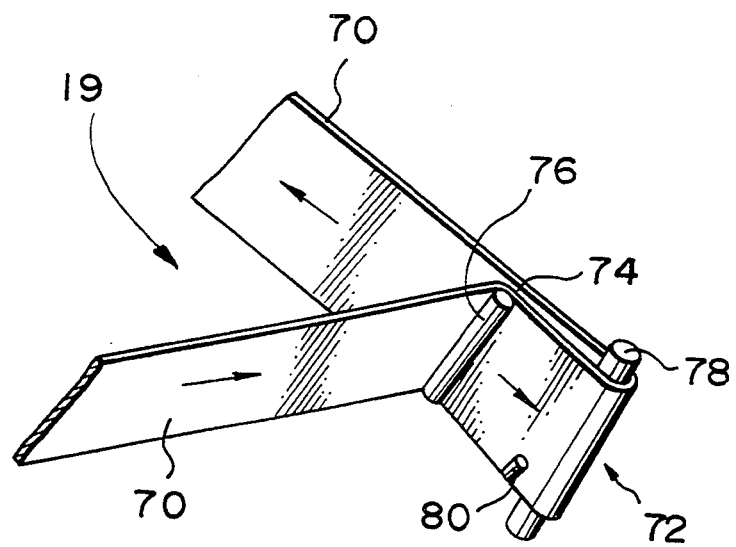
FIG. 12 is a schematic and perspective view of the side belt turning mechanism in the side conveyor belt at each corner.

FIG. 12 shows one side conveyor belt turning portion 72 at each corner 19. The components other than the side conveyor belt 70 and side conveyor belt turning portion 72 are omitted for simplification.

The side conveyor belt turning portion 72 comprises a side conveyor belt drawing-in guide 76 disposed to form a minute gap 74 for drawing in the side conveyor belt at each corner 19, and a side conveyor belt turning roller 78 for drawing the side conveyor belt 70 from the conveyance plane into the backside of the conveyance path through the gap 74. The side conveyor belt turning roller 78 is arranged such that the side conveyor belt 70 will be drawn in about the guide 76 through the gap 74 in a direction perpendicular to the upstream conveyance plane of the side conveyor belt 70 and also opposite to the downstream conveyance direction of the side conveyor belt 70.

In such an arrangement, the gap 74 formed at each corner 19 opens in a direction perpendicular to the upstream conveyance direction of the side conveyor belt 70, as shown in FIG. 5. Thus, the gap 74 can prevent articles and particularly thin plate-like articles from clogging therein.

The side belt drawing-in guide 76 shown in FIG. 12 may be replaced by the outwardly turned end of the side conveyance frame 71 shown in FIG. 6.

As shown in FIG. 12, the side conveyor belt turning portion 72 includes an idler 80 for preventing the side conveyor belt 70 from undesirably shifted. In the illustrated embodiment, the side conveyor belt 70 tends to be shifted downwardly since the side belt drawing-in guide 76 is outwardly tilted. Thus, the idler 80 is arranged to tension the side conveyor bell 70 drawn in through the gap 74 at the lower side edge thereof. If the side conveyor belt 70 is downwardly shifted, the idler 80 applies a force to the lower side edge of the side conveyor belt 70 so that the latter is returned to its original position.

Figure 13:
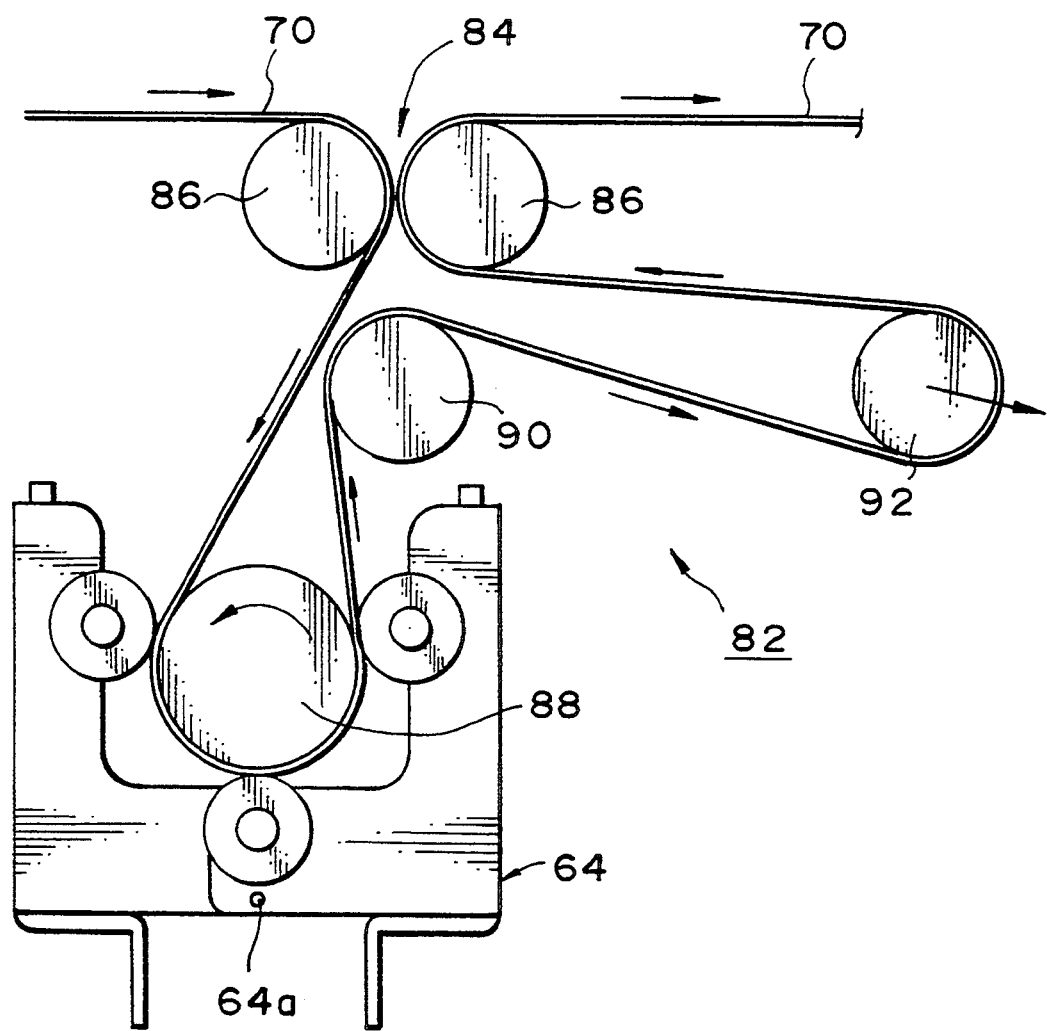
FIG. 13 is a schematic view or the drive mechanism for the side conveyor belt.

FIG. 13 schematically shows a side conveyor belt drive 82. In FIG. 13, the components other than the side conveyor belt 70 and its drive 82 are omitted for simplification.

The side conveyor belt drive 82 comprises side conveyor belt drawing-in guides 86 disposed opposite to each other to form a minute gap 84 for drawing in the side conveyor belt 70 therethrough, and drive, guide and tension rollers 88, 90 and 92, about all of which rollers the side conveyor belt 70 drawn in the backside of the conveyance plane through the gap 84 is turned. The drive roller 88 is rotatably driven in the direction of arrow by a motor (not shown) to move the side conveyor belt 70 in the direction of arrow. In order to prevent the side conveyor belt 70 from slipping on the drive roller 88, a clip 64 is detachably mounted about the drive roller 88 through the side conveyor belt 70 wound thereabout. The clip 64 is similar to that shown in FIGS. 9 and 10.

In order to absorb any slack in the side conveyor belt 70, a tension roller 92 is provided to tension the side conveyor belt 70 through a spring (not shown) in the direction or arrow at all times. When the side conveyor belt 70 is driven by the drive roller 88, therefore, it can be moved in the direction of arrow without any slack in the conveyance path at any place.

The side belt drawing-in guides 86 may be replaced by a slit that is formed in the side conveyance frame 71 or FIG. 6 with the opposite side edges thereof being turned inwardly.

The shovel robot 20 will now be described in detail.

Returning to FIG. 1, the shovel robot 20 is mounted on the partition platform 48 centrally located in the display space 16 and directed to the front of the display space.

Figure 2:
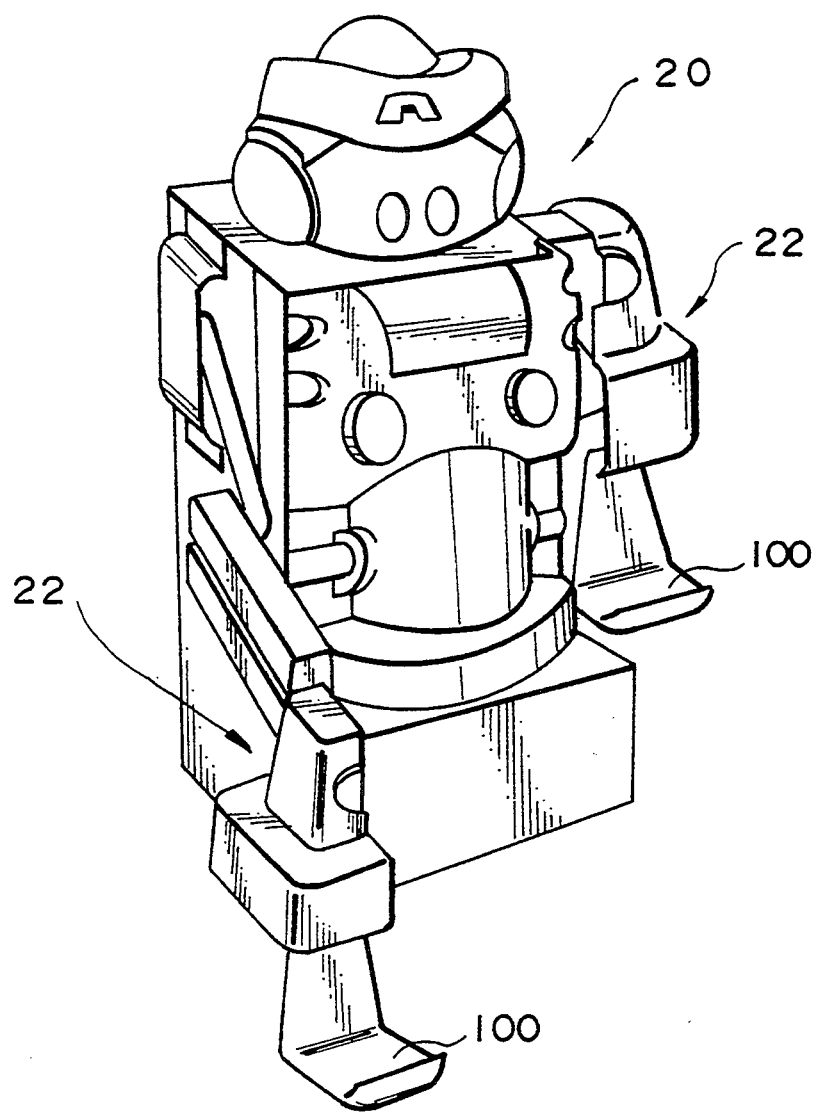
FIG. 2 is a schematic and perspective view of the shovel robot used in the game machine of FIG. 1.

Referring now to FIG. 2, the shovel robot 20 includes a pair of shovel arms 22 which are mounted thereon at the opposite sides. When each or the play buttons 26 is actuated, the corresponding shovel arm 22 is operated to pick up the articles conveyed on the conveyance platform 18. The pair of shovel arms 22 are of the same structure. Therefore, only the right-side shovel arm 22 will be described with reference to FIG. 14.

The shovel arm 22 comprises a resiliently deformable bucket 100 and a bucket drive means 110.

In at least its forward pick-up tip 102, the bucket 100 may have a given rigidity and be resiliently deformable within a given extent. To this end, the bucket 100 is formed of a resilient plastic material in the illustrated embodiment.

The bucket drive means 110 supports the top of the bucket 100 so tidal it can be tilted. The bucket drive means 110 applies a force to the bucket 100 in a direction intersecting the conveyance path (or the main conveyor belt 50) in the conveyance platform 18 such that the bucket 100 can be tilted forwardly to pick up the articles. In the illustrated embodiment, the bucket drive means 110 is adapted to move the bucket 100 in a direction perpendicular to the direction of conveyance.

The illustrated embodiment is characterized by that the bucket 100 is tilted by the forward force while moving the tilting center 104 of the bucket 100 downwardly. Thus, the bucket 100 can be moved below the articles while its shape being resiliently deformed.

FIGS. 19A, 19B, 20A and 20B schematically illustrate the concrete operation of the shovel.

Figure 19A:
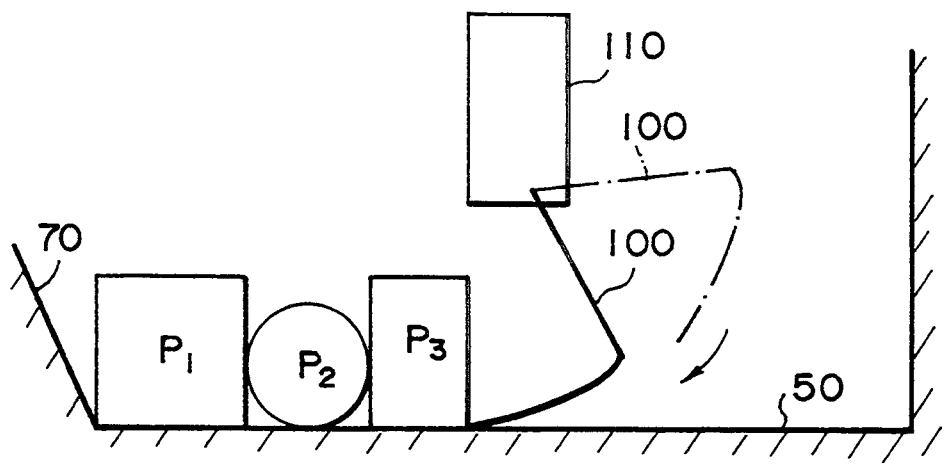
FIGS. 19A and 19B illustrate the picking-up of the articles by the bucket.
Figure 19B:
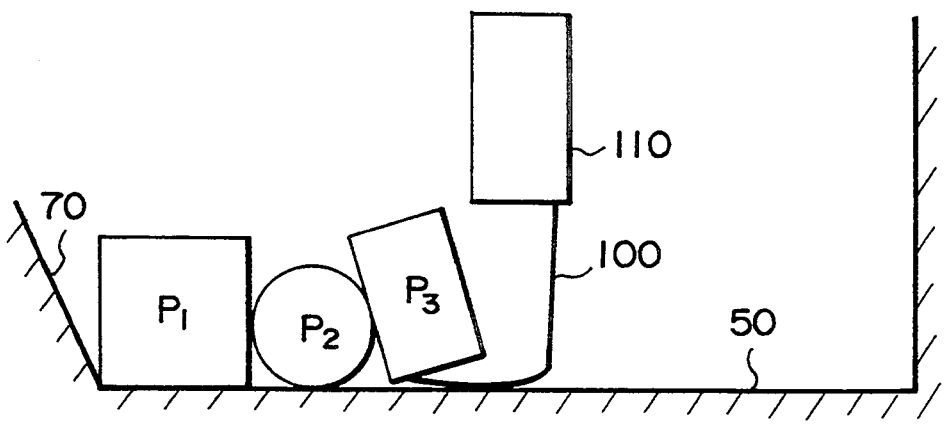

It is now assumed that articles P1, P2 and P3 are conveyed in a juxtaposed relationship on the conveyance path 50, as shown in FIG. 19A. If the bucket 100 is actuated in such a manner as described, the forward pick-up tip 102 of the bucket 100 can simply be moved below the article P3 to pick up it, as shown in FIG. 19B.

Figure 20A:
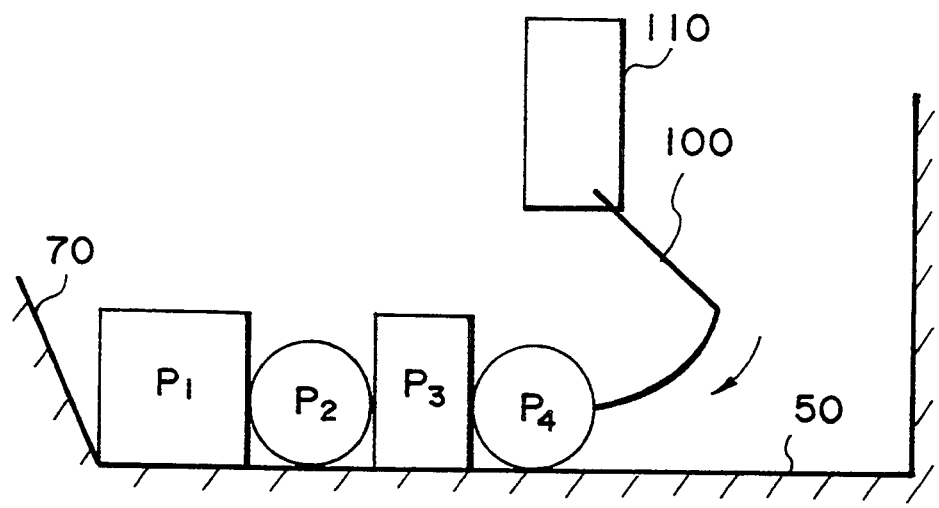
FIGS. 20A and 20B illustrate the picking-up of the articles by the bucket being downwardly moved.

On the contrary, if a further article P4 is conveyed while being placed adjacent to the article P3, the forward pick-up tip 102 of the bucket 100 will meet the side of the article P4, as shown in FIG. 20A.

Figure 20B:
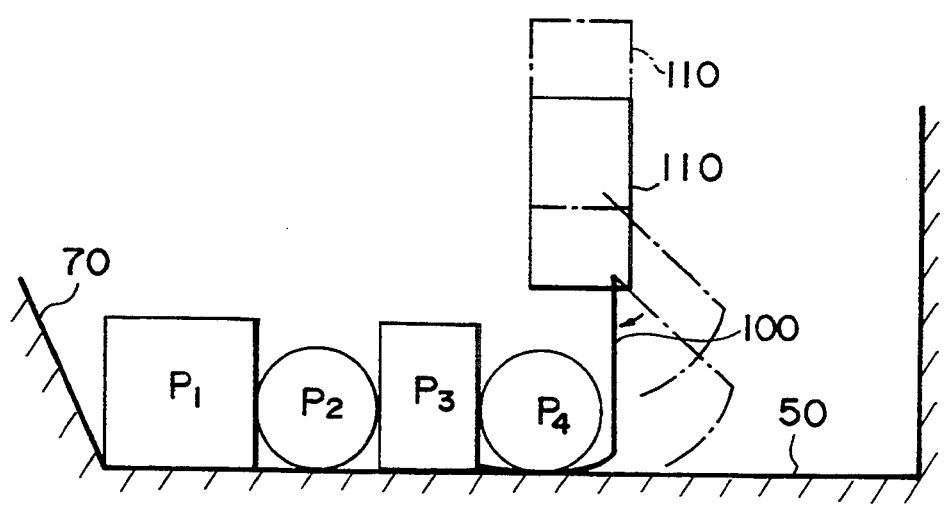

However, the tilting center 104 of the bucket 100 can be moved downwardly from FIG. 20A position to FIG. 20B position while the force is being applied to the bucket 100 in the direction of arrow. As a result, the forward pick-up tip 102 of the bucket 100 can be moved below the article P4 while being deformed.

In the illustrated embodiment, the bucket 100 can be moved while shifting its tilting center 104 downwardly, as shown in FIGS. 20A and 20B. This ensures that such an article P4 as not picked up by the prior art shovel arm can reliably be picked up by the bucket 100 of the present invention. This further improves the amusingness in the crane game.

Figure 14:
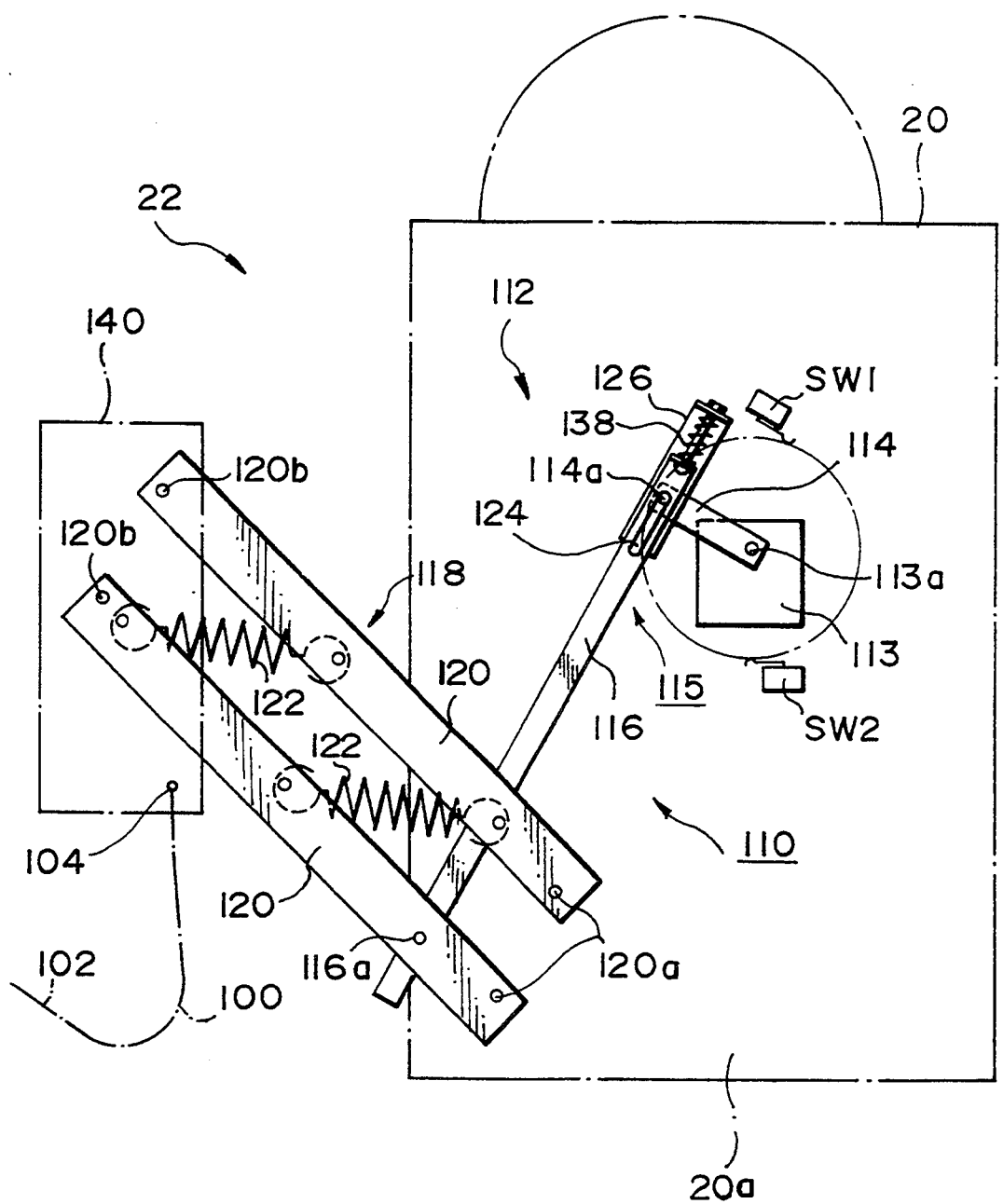
FIG. 14 is a schematic view of the entire construction of the shovel arm of the shovel robot shown in FIG. 2.

As shown in FIG. 14, the bucket drive means 110 comprises a bucket tilting drive 140 and a bucket elevating drive 112.

The bucket tilting drive 140 supports the top of the bucket 100 so that the latter can be tilted.

The bucket elevating drive 112 is adapted to move the bucket tilting drive 140 in the vertical direction to draw a given locus from a direction perpendicular to the direction of conveyance of the articles. The bucket elevating drive 112 comprises a motor 118 fixedly mounted on the side of the robot body 20a, a crank mechanism 115 fixedly mounted on the rotating shaft 113a of the motor 113 and adapted to transform the rotation of the motor 113 into a reciprocating linear motion, and an arm mechanism 118 for transforming the reciprocating liner motion of the crank mechanism 115 into a vertical oscillation to move the bucket tilting drive 140 in the vertical direction.

The crank mechanism 115 comprises a first crank arm 114 mounted on the rotating shaft 113a of the motor 113 and a second crank arm 116 pivotally connected to the first crank arm 114 through a pin and adapted to transform the rotational motion the first crank arm 114 into a reciprocating linear motion.

The arm mechanism 118 comprises a pair of parallel arms 120 and another pair of springs 122. Each of the parallel arms 120 is pivotally connected at its one end to the side of the robot body 20a through a fixed shaft 120a. The other end of the arm 120 is pivotally connected to the side of the bucket tilting drive 140 through a fixed shaft 120b. Each of the springs 122 is operatively located between the parallel arms 120 to provide an auxiliary elastic force for lifting the bucket tilting drive 140.

When the motor 113 is energized to rotate clockwise, the rotation thereof is transformed into a vertical motion through the second crank arm 116. Thus, the bucket tilting drive 140 and bucket 100 will be moved in the vertical direction to draw a given locus from the direction perpendicular to the conveyance direction of the articles. At this time, the angle of movement in the parallel arms 120 becomes 120 degrees as measured from the upright position thereof.

In the illustrated embodiment, particularly, the auxiliary elastic force is applied upwardly to the bucket tilting drive 140 and bucket 100 through the springs 122. As a result, the output of the motor 113 required to lift the bucket tilting drive 140 and bucket 100 can be reduced. This enables the motor to be reduced in its output.

FIGS. 21 to 24 illustrate a series of elevational operations carried out when the motor 113 is energized. As seen from these figures, the bucket 100 can be moved in the vertical direction along a given locus when the motor 113 rotates the first crank arm 114 clockwise through one complete revolution.

The pin-connection between the second crank arm 116 and the first crank arm 114 includes an arrangement which can protect the mechanism from any mechanical impact if the bucket or associated member is knocked by any obstruction to prevent its downward movement.

Figure 15:
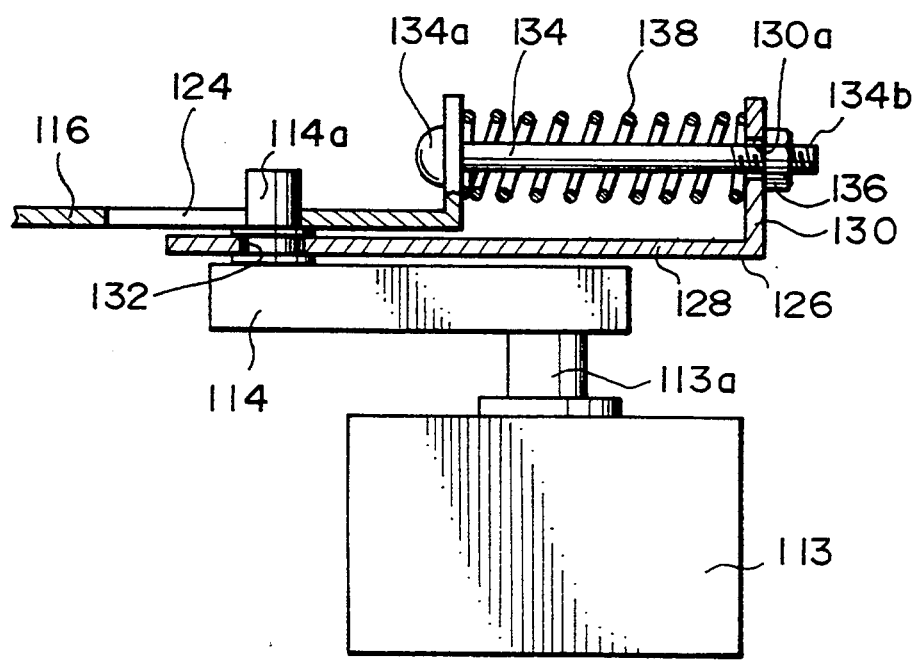
FIG. 15 is a view of the connection between the arm link and the arm crank in the shovel arm of FIG. 14.

FIG. 15 shows the details of such a mechanism. The second crank arm 116 includes an elongated slot 124 formed therein to receive an arm crank shaft 114a such that it can be moved in the slot 124.

A balance link 126 of L-shaped cross-section is located between the end of the second crank arm 116 and the first crank arm 114. The balance link 126 is adapted to elasticize the second crank arm 116 leftwardly through a spring 138. More particularly, one leg 128 of the L-shaped balance link 126 is pivotally connected to the crank shaft 114a through an aperture 132 formed therein. A bolt 134 extends between the other leg 130 of the balance link 126 and the end of the second crank arm 116 and through apertures formed therein. A spring 138 is located around the belt 134 between the other leg 130 of the balance link 126 and the end of the second crank arm 116. A nut 136 is screwed over the threaded end of the belt 134. More particularly, the head 134a of the belt 134 is fixed to the end of the second crank arm 116 while the threaded rod portion 134b is movably inserted through an aperture 130a formed in the leg 130 of the balance link 126. The nut 136 is screwed over the end of the threaded rod portion 134b so that the belt 134 will not be drawn out accidentally.

If the second crank arm 116 is prevented from being moved for any reason, the crank shaft 114a will be moved by a distance corresponding to the length of the slot 124 in a direction opposite to the elastic force of the spring 138. As a result, an impact applied from the crank shaft 114a to the second crank arm 116 can be attenuated. When the obstruction on the downward movement is removed, the spring 138 moves the second crank arm 116 to its normal position in the leftward direction as viewed in FIG. 15.

As shown in FIG. 14, two micro-switches SW1 and SW2 are angularly spaced away from each other and adjacent to the circular locus or the first crank arm 114. These micro-switches can be actuated by the first crank arm 114 when it is rotated.

The micro-switch SW1 is disposed to detect the position of the first crank arm 114 corresponding to the uppermost point (top dead center) of the rotation center 104 of the bucket 100 so that a state determined when the rotation center 104 or the bucket 100 is elevated to the top dead center can be detected. The micro-switch SW2 is arranged to detect the position of the first crank arm 114 corresponding to a position somewhat forward from the lowermost point (bottom dead center) of the rotation center 104 or the bucket 100 so that the position of the rotation center 104 of the bucket 100 when it is lowered to a position somewhat forward of the bottom dead center can be detected.

The bucket tilting drive 140 connected to the tip of the arm mechanism 118 in the elevating drive 112 will now be described.

Figure 16:
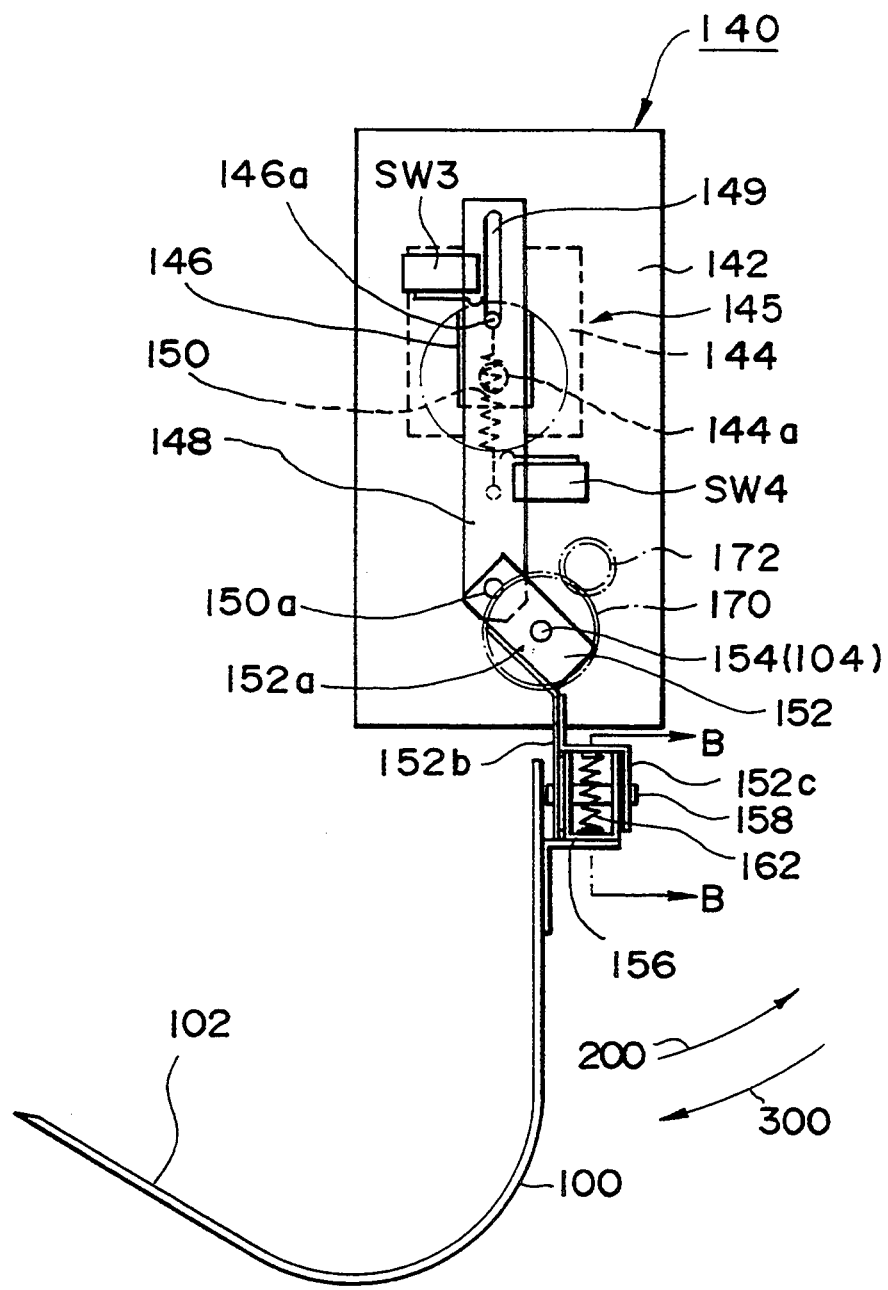
FIG. 16 is a schematic side view of the bucket tilting drive of the shovel arm shown in FIG. 14.
Figure 17:
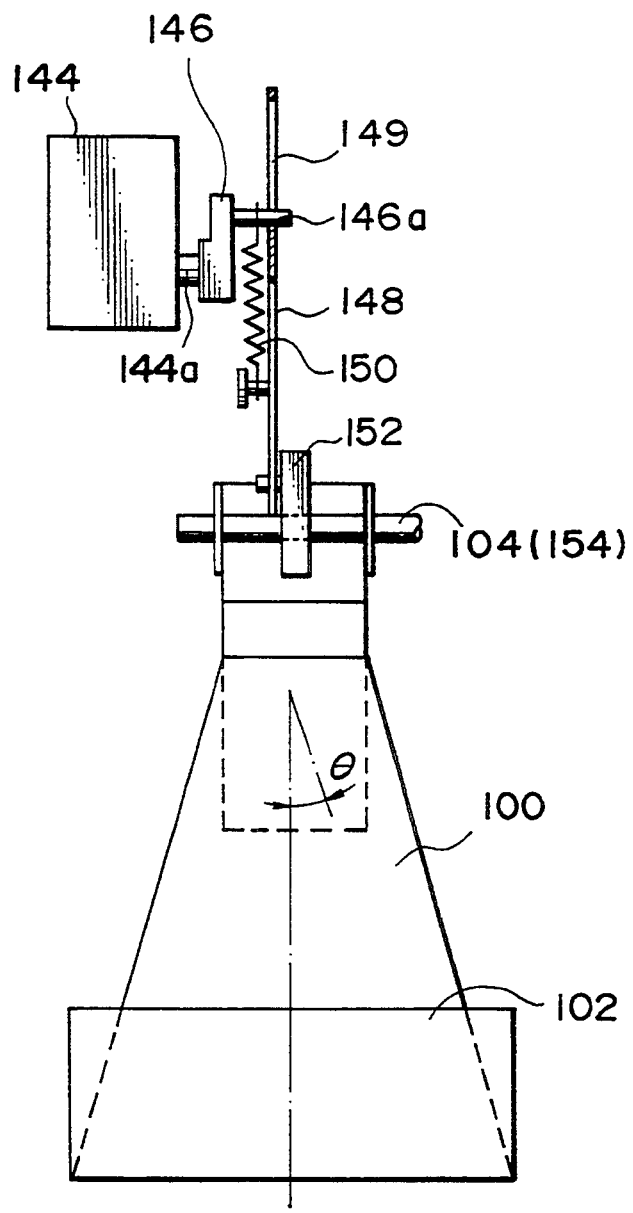
FIG. 17 is a schematic front view of the bucket tilting drive shown in FIG. 16.

FIG. 16 schematically shows the arrangement of the bucket tilting drive 140 while FIG. 17 schematically illustrates the left side of the arrangement as viewed in FIG. 16.

The bucket tilting drive 140 comprises a motor 144 fixedly mounted on a main drive body 142, a crank mechanism 145 mounted on tilt output shaft 144a of the motor 144 and adapted to transform the rotation of the motor into a reciprocating linear motion, and a bucket stay 152 for transforming the reciprocating motion of the crank mechanism 145 into a horizontal oscillation. The bucket tilting drive 140 causes the bucket 100 to perform its forward shoveling operation and its backward retracting operation.

The crank mechanism 145 comprises a first crank arm 146 fixedly mounted on the output shaft 144a of the motor 144 and a second crank arm 148 pivotally connected to the first crank arm 146 through a pin-connection and adapted to transform the rotation of the first crank arm 146 into a reciprocating linear motion.

The pin-connection between the first and second crank arms 146, 148 includes the crank shaft 146a of the first crank arm 146 pivotally engaged by an elongated slot 149 in the second crank arm 148. A tension and elasticity spring 150 is operatively located between the crank shaft 146a of the first crank arm 146 and the second crank arm 148.

As the motor 144 is energized, its rotation is transformed into a circular motion through the first crank arm 146. The circular motion is then transformed into a vertically linear motion through the second crank arm 148.

The end of the second crank arm 148 is pivotally connected to one end of the bucket stay 152 through a shaft 150a. The bucket stay 152 comprises three stay members 152a, 152b and 152c. The stay member 152a is pivotally connected to the drive body 142 through a rotating shaft 154 which is positioned at the tilting center 104 of the bucket 100. The other stay members 152b and 152c are fixedly mounted on a stay connection 156 of C-shaped cross-section which in turn is fixedly mounted on the bucket 100.

As the motor 144 is energized, the first crank arm 146 is rotatably driven with the rotation being transformed into the vertically linear motion through the second crank arm 148. Thus, the bucket 100 will be tilted about the rotation center 154 in such direction as shown by arrows 200 and 300 in FIG. 16. Particularly, if the first crank arm 146 is at twelve o'clock position as shown in FIG. 16, the second crank arm 148 has been lifted. Therefore, the bucket 100 is controlled to such a position as shown by solid line in FIG. 16.

As the first crank arm 146 is rotated clockwise from twelve o'clock position to six o'clock position, the second crank arm 148 is moved downwardly. Thus, the bucket 100 will be tilted in the direction of arrow 200. During the movement of the first crank arm 146 from six o'clock position to twelve o'clock position, the bucket 100 will be tilted in the direction of arrow 300.

In the illustrated embodiment, the slot 149 and bucket spring 150 are particularly provided to absorb any impact when the tilting of the bucket 100 in the direction of arrow 300 is obstructed for any reason. For example, if the tilting of the bucket 100 is obstructed as shown in FIG. 20A, the crank shaft 146a is moved in the slot 149 in its longitudinal direction to absorb the impact. Since at this time the crank shaft 146a moves to expand the spring 150, the spring 150 continues to elasticize the bucket 100 in the direction of arrow 300. If the obstruction is removed, the bucket 100 is tilted in the direction of arrow 300 under the elastic force of the spring 150. An impact created when the bucket 100 is tilted in the direction of arrow 300 under the elastic force may be attenuated through a spur gear 170 that is mounted on the rotating shaft 154 of the stay 152. The spur gear 170 engages an impact absorbing rotary damper 172 which is rotatably mounted on the drive body 142. In such a manner, any impact produced when the bucket 100 is rapidly tilted cannot be transmitted to the entire structure including the bucket and arms.

Two micro-switches SW3 and SW4 are provided to detect the position of the bucket 100 and adapted to indirectly sense the position of the bucket 100 through the angle of the first crank arm 146. More particularly, the micro-switch SW3 is mounted on the drive body 142 to detect the first crank arm 146 when it is in its twelve o'clock position. The micro-switch SW4 is mounted on the drive body 142 to sense the first crank arm 146 when it is its six o'clock position.

When an article is picked tip up by the bucket in such a manner as shown in FIGS. 19A, 19B, 20A and 20B, it is required to protect the entire mechanism by absorbing an impact created when the subsequently conveyed article strikes the side of the bucket 100. To this end, an impact absorbing mechanism is provided between the bucket stay 152 and the stay connection 156.

Figure 18:
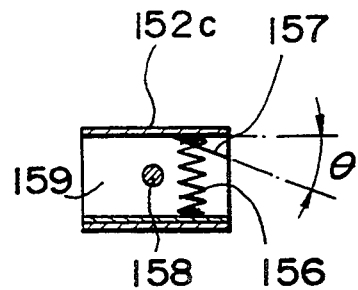
FIG. 18 is a schematic cross-section taken along a line B—B in FIG. 16.

Referring now to FIG. 18, the stay connection 156 includes a notch 157 formed therein at the right shoulder and adapted to permit the counter-clockwise rotation of the stay connection 156 about the shaft 158 by an angle θ. A compression spring 159 is further operatively located between the stay 152c and the stay connection 156 to apply a elastic force to the stay connection 156 so that it will be rotated clockwise.

If an article being conveyed strikes the side of the bucket 100, the bucket 100 can be tilted with the stay connection 156 by the angle θ against the elastic force of the compression spring 159 to absorb the impact. If the bucket 100 is released from the article striking the side thereof, the bucket 100 will be returned to its original position under the elastic force of the spring 159.

In such a manner, the entire mechanism may be protected from the impact by absorbing it even if many articles being conveyed strike the side of the bucket 100.

Figure 25:
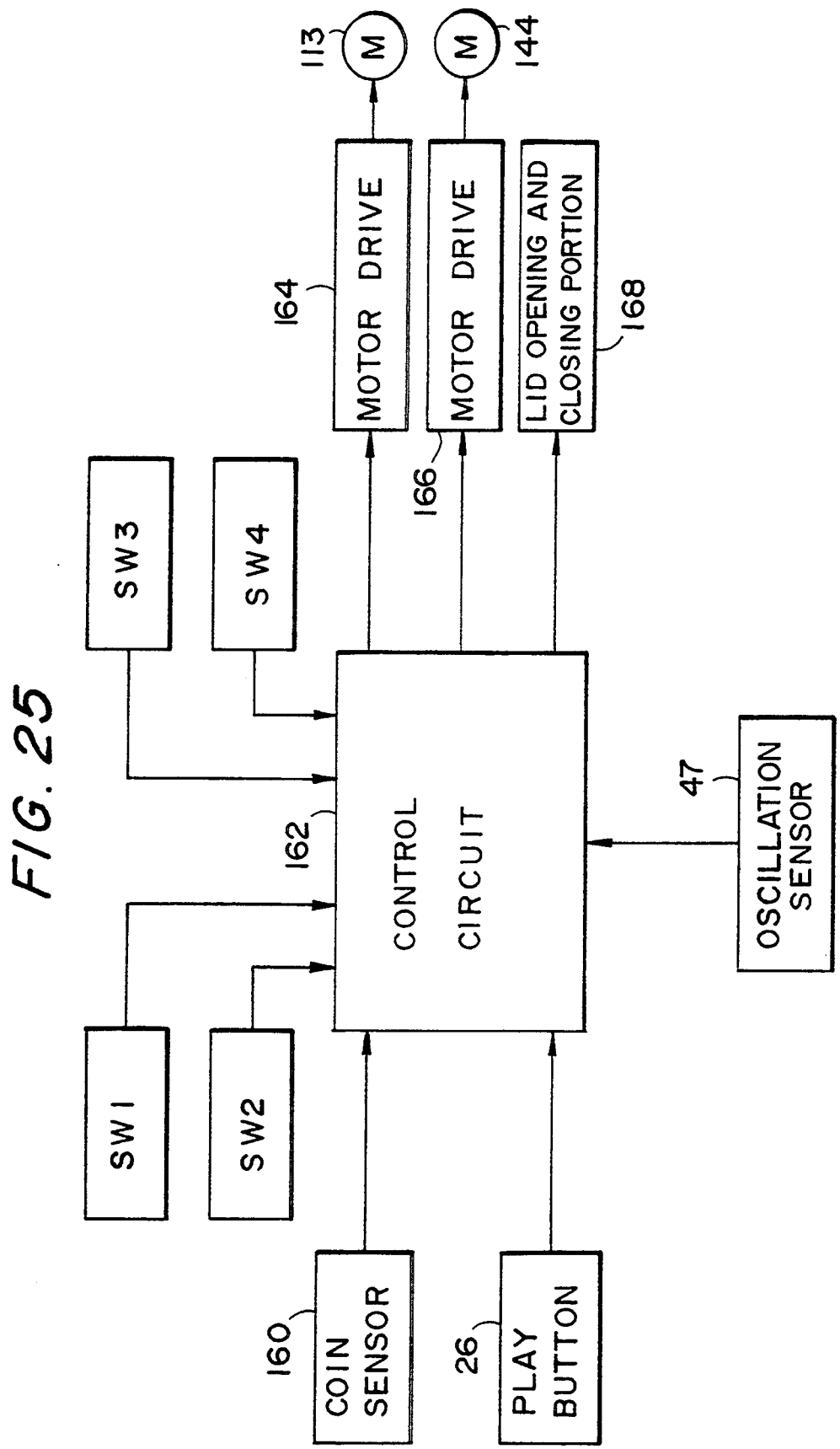
FIG. 25 is a block diagram of the primary parts of a drive and control mechanism for the shovel arm.

FIG. 25 shows a control circuit for the shovel robot 20 and for opening and closing the lid plate 46 shown in FIG. 3.

When the game machine is in its inorparative state, normally, the first crank arm 114 shown in FIG. 14 is in its position in which the micro-switch SW1 is turned on by the first crank arm 114. The bucket 100 is in its uppermost position. The first crank arm 146 of FIG. 16 is in its position in which the micro-switch SW4 is turned on by the first crank arm 146 while the bucket 100 is drawn in the direction of arrow 200 to direct its open top downwardly.

As a coin is inserted into the slot 26 under the above conditions, a coin sensor 160 senses the inserted coin to generate an output detection signal toward the control circuit 162.

When a given coin is thrown into the coin slot 26, the control circuit 162 actuates the lid opening and closing portion 168 to rotate the lid plate 46 from the position shown by alternate long and short dash line in FIG. 8 to the position shown by solid line in the same figure. As a result, the article gaining port 24 is opened. If the player intensionally oscillates the housing body 12 to take out articles during the game playing, the oscillation sensor 47 will sense such an intensional oscillation. The control circuit 162 actuates the lid opening and closing portion 168 so that the lid plate 46 is forcedly closed. This prevents any unfair practice.

The player may operate the play button 26 depending on his prediction for passage of an article to be gained while viewing the articles successively conveyed on the conveyance platform 18.

Figure 26:
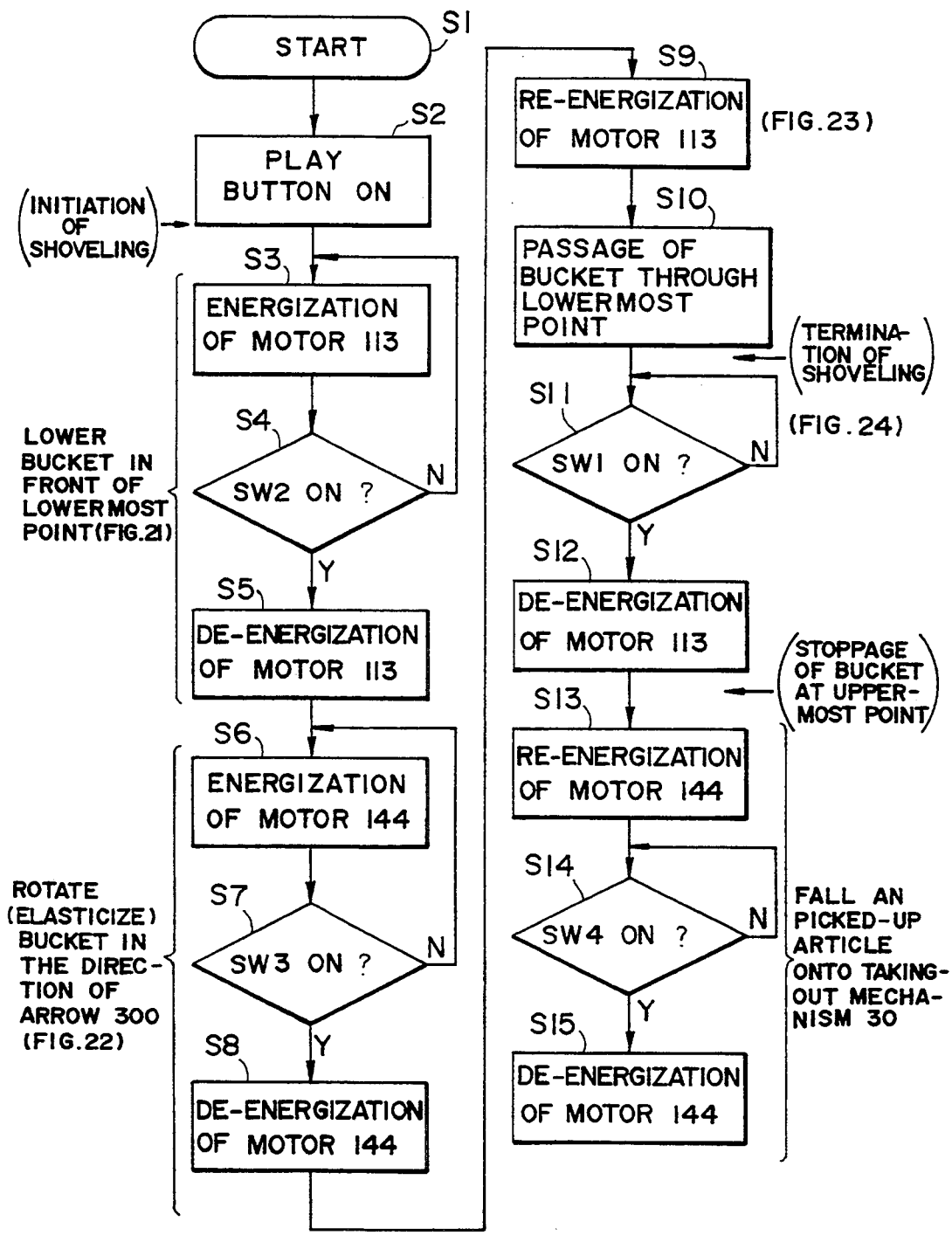
FIG. 26 is a flowchart illustrating the operation of the control circuit shown in FIG. 25.

FIG. 26 shows a flowchart illustrating the operation of the control circuit 162 when the play button 26 is manipulated by the player.

Figure 21:
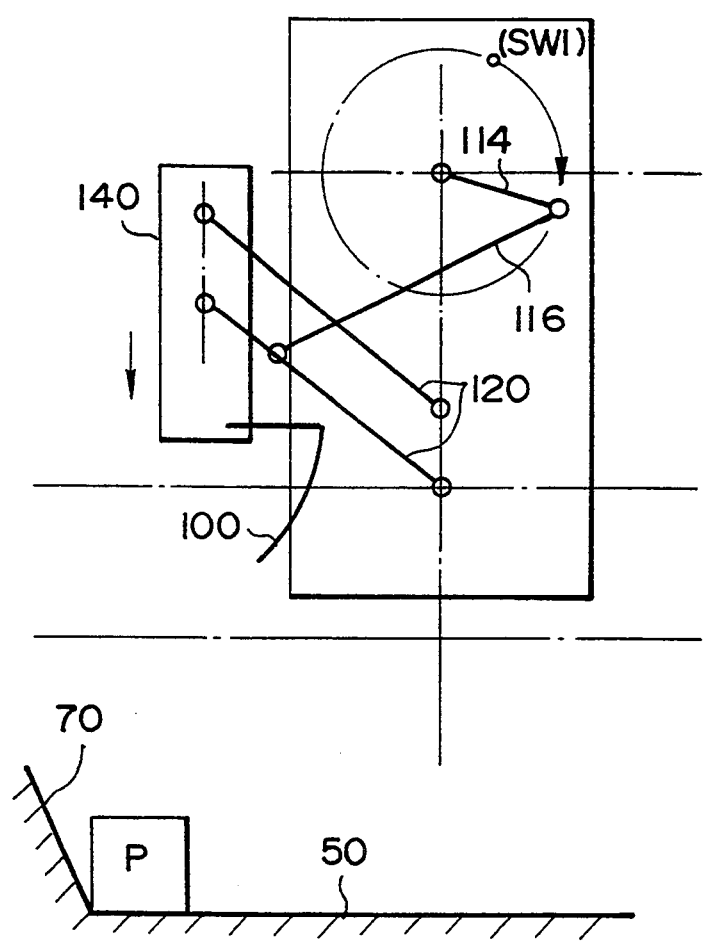
FIG. 21 is a view illustrating the operation of the shovel arm.

When the game is initiated (S1) and the play button 26 is turned on (S2), the control circuit 162 controls the motor drive 164 to energize the motor 113 (S3). The first crank arm 114 is initiated to rotate clockwise from the position corresponding to the micro-switch SW1, such that the bucket 100 will be moved downwardly to draw the locus perpendicular to the conveyance path as shown in FIG. 21.

Figure 22:
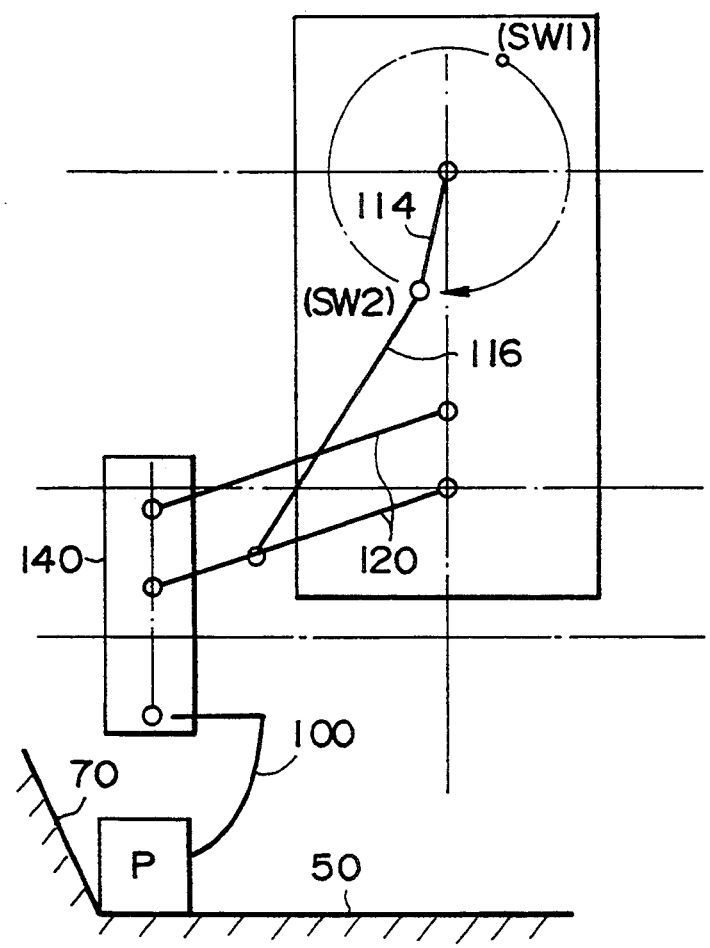
FIG. 22 is a view illustrating the operation of the shovel arm.
Figure 23:
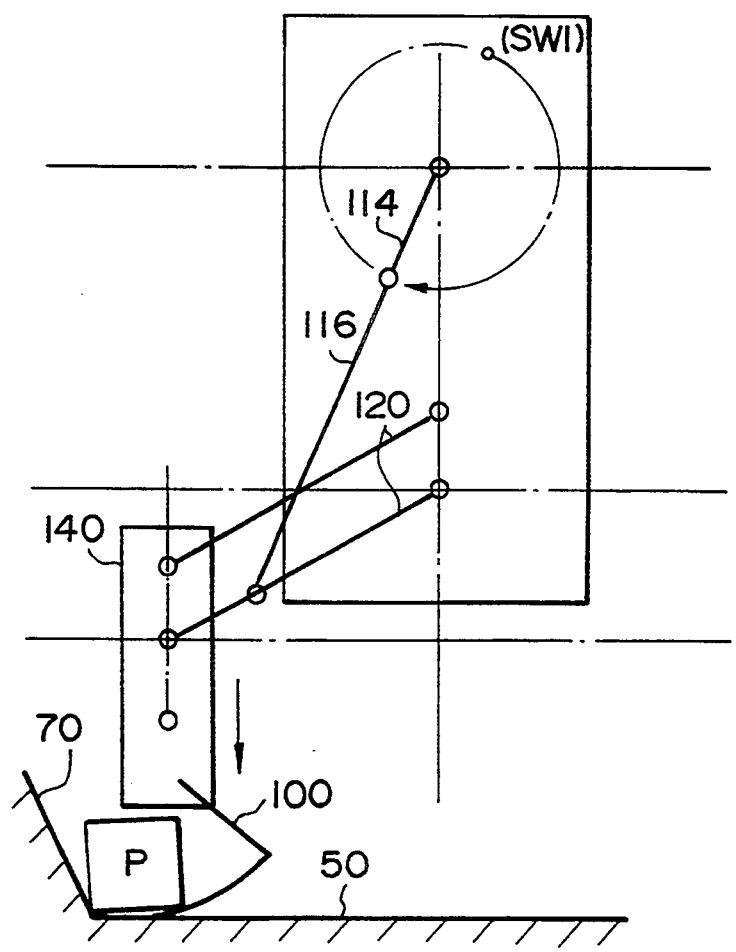
FIG. 23 is a view illustrating the operation of the shovel arm.

As the first crank arm 114 reaches the position in which the micro-switch SW2 is to be turned on, the micro-switch SW2 senses the first crank arm 114 (S4). Thus, the control circuit 162 de-energizes the motor 113 (S5). This is shown in FIG. 22. Under such a situation, the bucket 100 has been stopped forwardly of the lowermost point thereof.

As the micro-switch SW2 is turned on, the control circuit 162 energizes the motor 144 through the motor drive 166 to rotate the first crank arm 146 from the micro-switch SW4 toward the micro-switch SW3 clockwise as shown in FIG. 16. The bucket 100 is initiated to move in the direction of arrow 300 for picking up the articles. As the micro-switch SW3 is turned on by the first crank arm 146 (S7), the motor 144 is de-energized (S8).

If the bucket 100 is positioned relative to the articles on the conveyance path as shown in FIG. 19A, the bucket 100 can pick up an article P3.

However, if the bucket 100 is positioned relative to the articles as shown in FIG. 20A, the bucket 100 cannot move in the direction of arrow 300 by being blocked by the article P4. The bucket 100 is prevented from moving while being subjected to the elastic force in the direction of arrow 300.

Under such a state, the control circuit 162 re-starts the motor 113 (S9) to move the bucket 100 to its lowermost position as shown in FIG. 28. The forward pick-up tip 102 of the bucket 100 can be resiliently deformed to move below the article P4. This is shown in FIG. 28.

At time when the bucket 100 has passed through its lowermost position (S10), the bucket 100 can move below the article P4 to pick up it, as shown in FIG. 20B.

Figure 24:
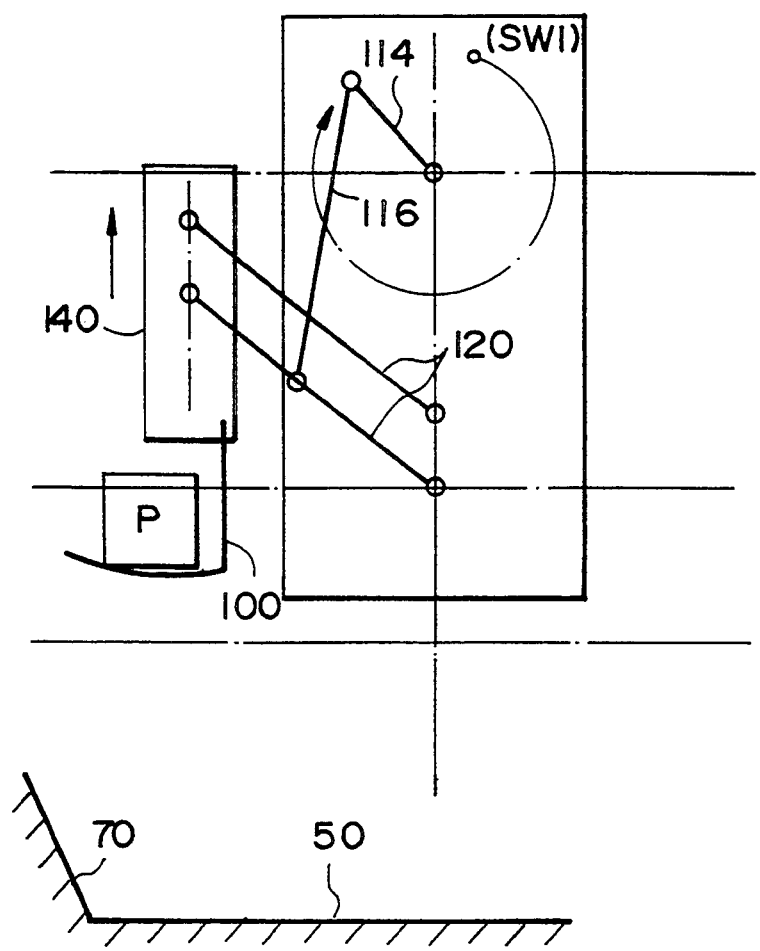
FIG. 24 is a view illustrating the operation of the shovel arm.

After the article P4 bas been picked up by the bucket 100, the first crank arm 114 is actuated to elevate the bucket 100, as shown in FIG. 24. Immediately when the micro-switch SW1 is turned on by the first crank arm 114, the motor 113 is de-energized (S11 and S12). The bucket 100 is stopped at its upper-most position.

In such a situation, the control circuit 162 re-starts the motor 144 to rotate the first crank arm 146 from the micro-switch SW3 (twelve o'clock position) to the micro-switch SW4 (six o'clock position) clockwise (S13, S14 and S15). The bucket 100 is thus tilted in the direction of arrow 200 to fall the picked-up article onto the sloping plate 36 shown in FIG. 1.

In such a manner, even if the bucket 100 is placed in such a position as shown in FIG. 20A, the shovel robot 20 can further move the bucket 100 downwardly so that the article can reliably be picked up by the bucket 100, as shown in FIG. 20B. This further improves the amusingness in the shovel game.

The present invent ion is not limited to the illustrated embodiment, but may be carried out in mainly modifications within the scope or the invention.

Although the illustrated embodiment bas been described as to the conveying system applied to the game machine, the present invention may be applied to any other system such as trade sample displaying system.

Although the illustrated embodiment has been described as to the shovel arms for picking up the articles, the present invention may be applied to any other forms such as crane-type game machine in which the crane picks up the articles.

Although the illustrated embodiment has been described as to the shovel type game machine, the present invention may be applied to any other game machine such as medals pick-up type game machine.

Although the illustrated embodiment has been described as to the rectangular layout of the transversely elongated conveyance path comprising the main and side conveyor belts, the layout of the conveyance path is not limited to such a rectangular layout and may be formed into any other layout, if required.

We claim:

1. A displaying and conveying apparatus for conveying articles to be displayed along an endless conveyance path including a plurality of corners, said displaying and conveying apparatus comprising:

main conveyor means including a main conveyor belt for endlessly conveying said articles to be displayed, and side conveyors means including a side conveyor belt for guiding said articles in the direction of conveyance, said main conveyor belt being disposed along an endless conveyance path having a plurality of corners, said side belt conveyor belt being disposed along the outer periphery of said main conveyor means and in a direction in which the conveyance plane of said side conveyor belt intersects the plane of conveyance in said main conveyor belt.

2. A displaying and conveying apparatus as defined in claim 1 wherein said main conveyor means includes a main belt tensioning portion which is provided between said adjacent corners to turn said main conveyor belt to be tensioned, said main belt tensioning portion comprising main belt tensioning guide means disposed to form a gap for drawing in said main conveyor belt and main belt tensioning and turning means about which said main conveyor belt is turned to be tensioned after said main conveyor belt has been drawn in through said gap in said main belt tensioning guide means.

3. A displaying and conveying apparatus as defined in claim 2 wherein said main conveyor means includes a main belt turning portion at each or said corners about which said main conveyor belt is turned, said main belt turning portion including main belt guide means disposed at each of said corners to form a gap for drawing in said main conveyor belt and main belt guiding and turning means about which said main conveyor belt is turned after it has been drawn in through the gap in said main belt guide means.

4. A displaying and conveying apparatus as defined in claim 3 wherein said main conveyor belt is a single endless one.

5. A displaying and conveying apparatus as defined in claim 1 wherein said main conveyor means includes a main belt turning portion at each of said corners about which said main conveyor belt is turned, said main belt turning portion including main belt guide means disposed at each of said corners to form a gap for drawing in said main conveyor belt and main belt guiding and turning means about which said main conveyor belt is turned after it has been drawn in through the gap in said main belt guide means.

6. A displaying and conveying apparatus as defined in claim 1 wherein said side conveyor means includes a side belt tensioning portion which is provided between said adjacent corners to turn said side conveyor belt to be tensioned, said side belt tensioning portion including side belt tensioning guide means disposed to form a gap for drawing in said side conveyor belt and side belt tensioning and turning means about which said side conveyor belt is turned to be tensioned after said side conveyor belt has been drawn in through the gap in said side belt tensioning guide means.

7. A displaying and conveying apparatus as defined in claim 6 wherein said side conveyor means includes a side belt turning portion at each of said corners, said side belt turning portion including side belt guide means disposed at each of said corners to form a gap for drawing in said side conveyor belt and side belt guiding and turning means about which said side conveyor belt is turned after it has been drawn in through the gap in said side belt guide means.

8. A displaying and conveying apparatus as defined in claim 7 wherein said side conveyor belt is a single endless one.

9. A displaying and conveying apparatus as defined in claim 8 wherein said side conveyor belt is tilted outwardly from the conveyance plane of said main conveyor belt by a given angle about an imaginary reference plane that is perpendicular to the conveyance plane of said main conveyor belt and disposed along the direction of conveyance.

10. A displaying and conveying apparatus as defined in claim 9 wherein said side conveyor belt has its lower side edge positioned below the conveyance plane of said main conveyor belt.

11. A displaying and conveying apparatus as defined in claim 10 wherein said main conveyor means includes a main belt tensioning portion which is provided between said adjacent corners to turn said main conveyor belt to be tensioned and a main belt turning portion at each of said corners about which said main conveyor belt is turned, said main belt tensioning portion comprising main belt tensioning guide means disposed to form a gap for drawing in said main conveyor belt and main belt tensioning and turning means about which said main conveyor belt is turned to be tensioned after said main conveyor belt has been drawn in through said gap in said main belt tensioning guide means, and said main belt turning portion including main belt guide means disposed at each of said corners to form a gap for drawing in said main conveyor belt and main belt guiding and turning means about which said main conveyor belt is turned after it has been drawn in through the gap in said main belt guide means, and wherein said conveyor belt is a single endless one.

12. A displaying and conveying apparatus as defined in claim 11 wherein said main belt guiding and turning means includes drive means for driving said main conveyor belt and skidproof means for positively transmitting a driving force from said drive means to said main conveyor belt and wherein said side belt guiding and turning means includes drive means for driving said side conveyor belt and skidproof means for positively transmitting a driving force from said drive means to said side conveyor belt.

13. A displaying and conveying apparatus as defined in claim 12 wherein said main belt turning portion includes idler means for preventing said main conveyor belt from being undesirably shifted and wherein said side belt turning portion includes idler means for preventing said side conveyor belt from being undesirably shifted.

14. A displaying and conveying apparatus as defined in claim 13 wherein each of said corners has an angle of 90 degrees and wherein said main conveyor belt drawing-in gap is a minute slit-like gap intersecting the conveyance direction of said main conveyor belt with an angle of 45 degrees, and said side conveyor belt being tilted outwardly from the conveyance plane of said main conveyor belt by an angle or 25 degrees about an imaginary reference plane that is perpendicular to the conveyance plane or said main conveyor belt and disposed along the direction of conveyance.

15. The displaying and conveying apparatus as defined in claim 11 wherein a gap for removing dirts is formed between said main and side conveyor belts.

16. A displaying and conveying apparatus as defined in claim 1 wherein said side conveyor means includes a side belt turning portion at each of said corners, said side belt turning portion including side belt guide means disposed at each of said corners to form a gap for drawing in said side conveyor belt and side belt guiding and turning means about which said side conveyor belt is turned after it has been drawn in through the gap in said side belt guide means.

17. A displaying and conveying apparatus as defined in claim 16 wherein said side belt guide means is adapted to draw said side conveyor belt into the backside of the conveyance plane at an upstream location.

18. A game machine comprising:

a displaying and conveying apparatus for conveying game articles to be displayed along an endless conveyance path including a plurality of corners, and article taking-out means responsive to the instruction of a player for taking out the game articles, said displaying and conveying apparatus comprising main conveyor means including a main conveyor belt for endlessly conveying said game articles and side conveyor means including a side conveyor belt for guiding the game articles in the direction of conveyance, said displaying and conveying apparatus being disposed on a display platform, and said side conveyor belt being disposed along the outer periphery of said main conveyor means and in a direction in which the conveyance plane of said side conveyor belt intersects the plane or conveyance in said main conveyor belt.

19. A game machine as defined in claim 18 wherein said main conveyor means includes a main belt tensioning portion which is provided between said adjacent corners to turn said main conveyor belt to be tensioned and a main belt turning portion at each of said corners about which said main conveyor belt is turned, said main belt tensioning portion comprising main belt tensioning guide means disposed to form a gap for drawing in said main conveyor belt and main belt tensioning and turning means about which said main conveyor belt is turned to be tensioned after said main conveyor belt has been drawn in through said gap in said main belt tensioning guide means, and said main belt turning portion including main belt guide means disposed at each of said corners to form a gap for drawing in said main conveyor belt and main belt guiding and turning means about which said main conveyor belt is turned after it has been drawn in through the gap in said main belt guide means, and wherein said side conveyor means includes a side belt turning portion at each of said corners and a side belt tensioning portion which is disposed between said adjacent corners to turn said side conveyor belt to be tensioned, said side belt turning portion including side belt guide means disposed at each of said corners to term a gap for drawing in said side conveyor belt and side belt guiding and turning means about which said side conveyor belt is turned after it has been drawn in through the gap in said side belt guide means, said side belt tensioning portion including side belt tensioning guide means disposed to form a gap for drawing in said side conveyor belt and side belt tensioning and turning means about which said side conveyor belt is turned to be tensioned after said side conveyor boil has been drawn in through the gap in said side belt tensioning guide means.

20. A game machine as defined in claim 19 wherein said main conveyor belt is a single endless one and wherein said side conveyor belt is a single endless one.

21. A game machine as defined in claim 20 wherein said side conveyor belt is tilted outwardly from the conveyance plane of said main conveyor belt by a given angle about an imaginary reference plane that is perpendicular to the conveyance plane of said main conveyor belt and disposed along the direction of conveyance and wherein said side conveyor belt has its lower side edge positioned below the conveyance plane of said main conveyor belt.

22. A game machine as defined in claim 21 wherein said main belt guiding and turning means includes drive means for driving said main conveyor belt and skid-proof means for positively transmitting a driving force from said drive means to said main conveyor belt and wherein said side belt guiding and turning means includes drive means for driving said side conveyor belt and means for positively transmitting a driving force from said drive means to said side conveyor belt.

23. A game machine as defined in claim 22 wherein said main belt turning portion includes idler means for preventing said main conveyor belt from being undesirably shifted and wherein said side belt turning portion includes idler means for preventing said side conveyor belt from being undesirably shifted.

24. A game machine as defined in claim 23 wherein each of said corners has an angle of 90 degrees and wherein said main conveyor belt drawing-in gap is a minute slit-like gap intersecting the conveyance direction of said main conveyor belt with an angle of 45 degrees, and said side conveyor belt being tilted outwardly from the conveyance plane of said main conveyor belt by an angle of 25 degrees about an imaginary reference plane that is perpendicular to the conveyance plane of said main conveyor belt and disposed along the direction of conveyance.

25. A game machine as defined in claim 21 wherein a gap for removing dirts is formed between said main and side conveyor belts.

26. A game machine as defined in claim 21 wherein said article taking-out means includes an article picking-up portion responsive to the instruction of a player to pick up and fall the game articles at a predetermined position.

27. A game machine as defined in claim 20 wherein said article taking-out means includes an article picking-up portion responsive to the instruction of a player to pick up and fall the game articles at a predetermined position.

28. A game machine as defined in claim 19 wherein said article taking-out means includes an article picking-up portion responsive to the instruction of a player to pick up and fall the game articles at a predetermined position.

29. A game machine as defined in claim 28 wherein said article taking-out means comprises an article feeding-out portion for sequentially receiving and feeding articles fallen down from said article picking-up portion to an article taking-out port, said article feeding-out portion including an article pressing-out portion, a fixed plate having one end directed to said article taking-out port, and a slide plate disposed oil said fixed plate to sequentially receive the game articles fallen down from said article picking-up portion, said slide plate being reciprocatable between a position in which the forward end of said slide plate is in front of said article taking-out port and another position in which the rearward end of said slide plate is moved below said article pressing-out portion by a given distance, whereby the game articles moved onto said slide plate can sequentially be pressed toward the forward end of said slide plate by said article pressing-out portion and fallen onto said fixed plate, the game articles fallen onto said fixed plate being sequentially pressed out by the forward end of said slide plate toward said article taking-out port through the forward movement of the slide plate.

30. A game machine as defined in claim 29 wherein said main conveyor belt is a single endless one and wherein said side conveyor belt is a single endless one.

31. A game machine as defined in claim 30 wherein said side conveyor belt is tilted outwardly from the conveyance plane of said main conveyor belt by a given angle about an imaginary reference plane that is perpendicular to the conveyance plane of said main conveyor belt and disposed along the direction of conveyance and wherein said side conveyor belt has its lower side edge positioned below the conveyance plane of said main conveyor belt.

32. A game machine as defined in claim 31 wherein said article taking-out means includes a lid plate that can block or open a passageway formed between the article taking-out port and said display platform, said lid plate being adapted to open said passageway only during a period from the start or the game to the end of the game.

33. A game machine as defined in claim 32 wherein said lid plate is adapted to block said passageway when the machine is intentionally oscillated by the player.

34. A game machine as defined in claim 33 wherein the top of said display platform is covered with a covering portion, said covering portion being entirely or partially transparent such that the player can observe the game articles through said covering portion.

35. A game machine as defined in claim 19 wherein the top of said display platform is covered with a covering portion, said covering portion being entirely or partially transparent such that the player can observe the game articles through said covering portion.

* * * * *